(12) United States Patent
Ganguly et al.

(10) Patent No.: US 12,462,058 B2
(45) Date of Patent: Nov. 4, 2025

(54) SENSITIVE-DATA-AWARE ENCODING

(71) Applicant: International Business Machines Corporation, Armonk, NY (US)

(72) Inventors: Debasis Ganguly, Dublin (IE); Martin Gleize, Dublin (IE); Pierpaolo Tommasi, Dublin (IE); Yufang Hou, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 17/320,488

(22) Filed: May 14, 2021

(65) Prior Publication Data

US 2022/0366074 A1    Nov. 17, 2022

(51) Int. Cl.
  *G06F 21/62*   (2013.01)
  *G06F 18/23*   (2023.01)
  *G06N 20/20*   (2019.01)
  *G06V 10/75*   (2022.01)

(52) U.S. Cl.
  CPC .......... *G06F 21/6245* (2013.01); *G06F 18/23* (2023.01); *G06N 20/20* (2019.01); *G06V 10/751* (2022.01)

(58) Field of Classification Search
  CPC ........ G06F 18/213; G06F 18/23; G06F 18/24; G06F 21/6245; G06N 20/20
  See application file for complete search history.

(56) References Cited

U.S. PATENT DOCUMENTS

| | | | |
|---|---|---|---|
| 8,744,119 B2 | 6/2014 | Shuster | |
| 9,438,412 B2 | 9/2016 | Rane et al. | |
| 9,552,645 B2 * | 1/2017 | Ying | G06T 7/10 |
| 9,946,970 B2 | 4/2018 | Gilad-Bachrach et al. | |
| 10,043,035 B2 | 8/2018 | LaFever et al. | |
| 10,528,763 B2 | 1/2020 | Popescu | |
| 11,741,698 B2 * | 8/2023 | Rosman | G08G 1/165 |
| 11,755,743 B2 * | 9/2023 | Sharma | G06F 21/55 |
| | | | 726/25 |
| 2002/0147754 A1 * | 10/2002 | Dempsey | G06F 18/22 |
| | | | 708/671 |

(Continued)

FOREIGN PATENT DOCUMENTS

| | | | |
|---|---|---|---|
| JP | 2019514301 A | 5/2019 | |
| WO | 2014137394 A1 | 9/2014 | |

(Continued)

OTHER PUBLICATIONS

Coavoux et al., "Privacy-preserving Neural Representations of Text," Proceedings of the 2018 Conference on Empirical Methods in Natural Language Processing, 2018, 10 pages, https://www.aclweb.org/anthology/D18-1001/.

(Continued)

*Primary Examiner* — Abu S Sholeman
(74) *Attorney, Agent, or Firm* — Daniel M. Yeates

(57) ABSTRACT

Submitting a data space to a provider can risk exposing sensitive information in the data space. To protect the sensitive information, the data space can be analyzed to identify features that are relevant to sensitive information and features that are relevant to a goal task. Features that are relevant to the sensitive information but are not relevant to the goal task can be pruned from the data space, and the pruned data space can be transmitted to the provider.

20 Claims, 10 Drawing Sheets

(56) References Cited

U.S. PATENT DOCUMENTS

| | | | |
|---|---|---|---|
| 2005/0147240 A1* | 7/2005 | Agrawal | G06F 21/60 380/28 |
| 2005/0177414 A1* | 8/2005 | Priogin | G06Q 10/06 706/21 |
| 2007/0011158 A1* | 1/2007 | Parikh | H04L 63/20 |
| 2014/0101438 A1 | 4/2014 | Elovici et al. | |
| 2015/0379422 A1 | 12/2015 | Chandler | |
| 2018/0240219 A1* | 8/2018 | Mentl | G06N 3/08 |
| 2018/0359098 A1* | 12/2018 | Berkvens-Matthijsse | H04L 9/3247 |
| 2019/0188421 A1* | 6/2019 | Meira Pires de Azevedo | G06N 3/045 |
| 2019/0251290 A1 | 8/2019 | Maier et al. | |
| 2020/0050943 A1* | 2/2020 | Ishii | G06N 3/08 |
| 2020/0081865 A1* | 3/2020 | Farrar | G06N 20/00 |
| 2021/0287119 A1* | 9/2021 | Rink | G06Q 30/0201 |
| 2022/0012741 A1* | 1/2022 | Raj | G06Q 20/405 |
| 2022/0138561 A1* | 5/2022 | Prendki | G06N 3/08 706/12 |
| 2022/0366074 A1* | 11/2022 | Ganguly | G06N 20/20 |
| 2023/0419102 A1* | 12/2023 | Truong | G06N 3/0464 |
| 2025/0265508 A1* | 8/2025 | Lee | G06N 20/20 |

FOREIGN PATENT DOCUMENTS

| | | | |
|---|---|---|---|
| WO | 2017222902 A1 | 12/2017 | |
| WO | 2018151552 A1 | 8/2018 | |

OTHER PUBLICATIONS

Li et al., "Towards Robust and Privacy-preserving Text Representations," Proceedings of the 56th Annual Meeting of the Association for Computational Linguistics, 2018, 6 pages, https://www.aclweb.org/anthology/P18-2005/.

Elazar et al., "Adversarial Removal of Demographic Attributes from Text Data," Proceedings of the 2018 Conference on Empirical Methods in Natural Language Processing, 2018, 11 pages, tps://www.aclweb.org/anthology/D18-1002/.

Yi et al., "Privacy and Regression Model Preserved Learning," Proceedings of the Twenty-Eighth AAAI Conference on Artificial Intelligence, Association for the Advancement of Artificial Intelligence (www.aaai.org), Copyright 2014, Printed May 11, 2021, 7 pages, https://pdfs.semanticscholar.org/0483/6cce4d1b5dbd285c1c7480a5643a29e7b87d.pdf.

Bolukbasi et al., "Man is to Computer Programmer as Woman is to Homemaker? Debiasing Word Embeddings," Printed May 11, 2021, 9 pages, https://papers.nips.cc/paper/6228-man-is-tocomputer-programmer-as-woman-is-to-homemaker-debiasing-wordembeddings.pdf.

Sen et al., "Towards Socially Responsible AI: Cognitive Bias-Aware Multi-Objective Learning," Association for the Advancement of Artificial Intelligence (www.aaai.org), Copyright 2020, Printed May 11, 2021, 8 pages, https://aaai.org/Papers/AAAI/2020GB/AAAI-SenP.1698.pdf.

Donahue et al., "Adversarial Feature Learning," Published as a conference paper at ICLR 2017, 18 pages, arXiv:1605.09782 (2017).

Malekzadeh et al., "Mobile Sensor Data Anonymization," International Conference on Internet-of-Things Design and Implementation(IoTDI '19), Apr. 15-18, 2019, Montreal, QC, Canada, 10 pages https://doi.org/10.1145/3302505.3310068.

Dobra et al., "Assessing the Risk of Disclosure of Confidential Categorical Data," Bayesian Statistics 7, Copyright Oxford University Press, 2003, 20 pages.

Sankar et al., "Utility-Privacy Tradeoffs in Databases: An Information-Theoretic Approach," IEEE Transactions on Information Forensics and Security, vol. 8, No. 6, Jun. 2013, 15 pages.

* cited by examiner

SENSITIVE-DATA-AWARE ENCODING

BACKGROUND

The systems and methods of the present disclosure relate to data security.

Machine learning models are usually trained before they can be utilized. Training a machine learning model requires repetitive operation and modification of the model. Deep learning models can be particularly resource-intensive to train. As a solution, some companies offer "Machine Learning as a Service" (MLaaS). In order to utilize MLaaS, a client may send data to a MLaaS provider, such as a remote server. In many MLaaS implementations, a client can encode data and send the encoded data to the provider. The MLaaS provider can then utilize the encoded data to train a machine learning model, which can reduce bandwidth requirements.

SUMMARY

Some embodiments of the present disclosure can be illustrated as a method. The method comprises receiving a data space. The method further comprises identifying features of the data space that are relevant to sensitive information. The method further comprises defining a sensitive subspace within the data space. The sensitive subspace is defined so that it includes the identified features. The method further comprises identifying additional features of the data space that are relevant to a goal task. The method further comprises defining a goal subspace within the data space. The goal subspace is defined so that it includes the additional features. The method further comprises identifying a subset of features included in the sensitive subspace but not in the goal subspace. The method further comprises pruning the data space by removing the subset of features. This results in a pruned data space. The method further comprises transmitting the pruned data space to a provider.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
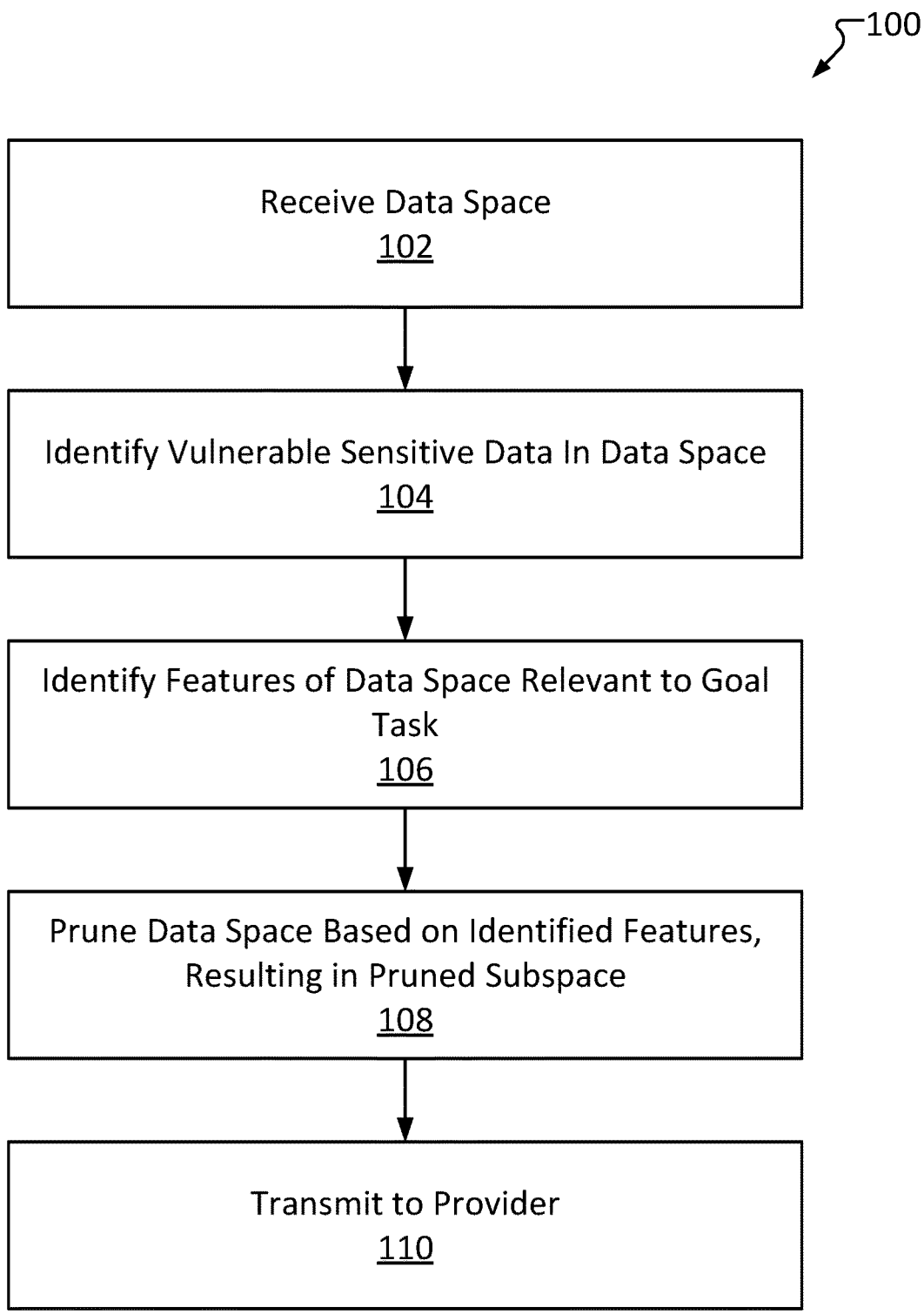
FIG. 1 is a high-level method for sensitive-data-aware encoding, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to prune data spaces prior to transmitting them to providers. More particular aspects relate to receiving a data space, identifying features relevant to a goal task, pruning the data space to remove features that are not relevant to the goal task, and transmitting the pruned data space to a provider.

In order to train particularly complex machine learning models (MLMs), such as deep neural networks (DNNs), many developers transmit training data to a Machine Learning as a Service (MLaaS) provider. The MLaaS provider then utilizes the training data to train a model, and provides the trained model to the developer. This allows the developer to acquire a trained model despite the computational resource demands of training such a model. However, the transfer of training data might be intercepted by a third party, such as a malicious actor. Depending upon the nature of the training data, a malicious actor might be able to discern sensitive information from the data.

As an example, a developer may require a trained MLM to determine whether a person depicted in an image is smiling or frowning. Training such a model may require millions of images of human faces. As the developer may not have the resources to train the MLM "in-house" (i.e., with the developer's own computer systems), the developer may send a set of training images to an MLaaS provider. If this transfer were intercepted, a malicious actor may be able to access the images of faces, as well as any sensitive data that might be gleaned from them (e.g., age, gender, etc.).

Training data is often "encoded" before it is transmitted, which can provide several benefits. For example, the encoding may help to prevent a malicious actor from obtaining the original data itself (e.g., the images) even if the transmission is intercepted. In many instances, this encoding has an added benefit of reducing a total amount of data to be transmitted, similar to compression.

Input data may be encoded into a vector space of features, wherein the vector of features can be transmitted instead of the raw training data itself. As an example, input data consisting of an image may be encoded into an array of data (the vector space of features) describing curves or edges in the image. This encoding process may be similar to (but distinct from) compression and/or encryption; raw data of, for example, an image is processed into encoded data which may appear unintelligible to humans but can be interpreted quickly with an appropriate model. These features may be utilized by a machine learning model to perform a goal task such as, for example, determining whether a person depicted in the image is happy or sad. In order to train the model, the data may be sent to a remote provider. However, depending upon the data and how it is encoded, a malicious actor intercepting the transmission may still be able to discern some sensitive information from the encoded data. This is possible because the malicious actor may have a machine learning model of its own. For instance, just as a developer's machine learning model might determine a person's emotion based on a set of encoded features of an input image of the person's face, a malicious actor's machine learning model might be able to use the same set of encoded features to determine the person's age, gender, etc. As an example, an input image may be encoded into features of the image (e.g., edges, curves, etc.). A machine learning model can be trained to receive the features and perform a task based on the features. The same set of features can enable performance of several different tasks by various models; in other words, different models can determine different things about an image based on the same set of features of the image. Once trained, a model can be utilized with different images to perform the same task. For example, once a model has been trained to determine whether a person depicted in an input image is smiling or frowning, different images may be input into the trained model, and the model will determine whether, for each image, a person depicted in the image is smiling or frowning.

While this is beneficial to a developer wishing to perform an innocuous task via the developer's own model, a malicious actor may be equipped with a different, pretrained model capable of performing a different task (where that task might be identifying sensitive information) based on the same input features. Thus, the malicious actor may only need access to the features in order to perform the task. However, not all features in a given set of encoded features are required for a given goal task. Further, some features which are not required for the goal task might be particularly useful to a malicious actor. Thus, identifying and removing those features might prevent the malicious actor from gleaning sensitive information without a significant impact on performance of the goal task.

Systems and methods consistent with the present disclosure enable protection of sensitive data by pruning an input data space to remove portions of the input data that might be leveraged to reveal the sensitive data. For example, an input data space might be an encoded feature space generated from an input image of a person's face. The features might describe several aspects of the image. Some features might be particularly relevant to a goal task, while other features might not be useful for the goal task. For example, features describing curves and edges in an input image of a person's face might be useful for determining the person's emotion, as they might describe a shape of the person's mouth (suggesting whether the person is smiling or frowning), brow, (eyebrows could show surprise, furrowed brow could show anger), etc. However, features describing color of a person's hair might not be useful for determining the person's emotion, as hair color and emotion are generally not correlated.

In a similar manner, some features might be particularly relevant to a malicious actor's task, while other features might not be useful for the malicious actor's task. For example, features describing color of a person's hair might be particularly useful for determining the person's age, as presence of gray and/or white hair might indicate that the depicted person is older. While this correlation is not dispositive (e.g., a person having gray and/or white hair is not necessarily older, and a person not having gray and/or white hair is not necessarily younger), it might still be a relatively strong predictor.

Continuing with the above example, as hair color is not useful for the goal task of emotion detection, pruning the data space to exclude features describing hair color can advantageously prevent exposure of the sensitive information (the person's age) without compromising accuracy of the goal task (emotion detection).

In some instances, features might be useful for both a goal task and a malicious actor's task. For example, features describing curves or edges in an image of a person's face might be helpful in identifying whether the person is smiling or frowning (relevant to goal task of emotion detection), but they might also be helpful in identifying presence or absence of wrinkles in the person's face (relevant to a malicious actor's task of age detection). Thus, while pruning the input data space to exclude the features that describe curves or edges might further protect the sensitive data (the person's age), this may come with a significant penalty to accuracy of the goal task.

In order to address this, some systems and methods consistent with the present disclosure can also enable providing a user with information regarding which sensitive data might be vulnerable, an accuracy cost associated with protecting the sensitive data, and an option allowing the user to selectively prune the input data space to balance protection of sensitive data with goal task accuracy. For example, a system may determine that an input data space of encoded images of persons' faces risks exposing sensitive data in the form of "age of depicted persons." While other types of sensitive data may be determined to be at risk as well (e.g., weight, certain facial features such as moles or scars, other possibly identifying characteristics such as tattoos, whether the person is wearing eyeglasses, etc.), particularly in instances with different kinds of input data (e.g., audio recordings might risk exposure of a person's regional accent, etc.), but in the interest of brevity, the present example only addresses a single category of sensitive data. As part of determining that the sensitive data is at risk, an example system might determine which features of the input data space are most relevant to the goal task, which are most relevant to the sensitive data, as well as overlap between the two.

Features relevant to a given task (such as the goal task or the sensitive data) can be identified by performing multiple attempts to train a machine learning model with different features as input training data. In essence, an example system consistent with the present disclosure might obtain a set of features and utilize a subset of features to train a machine learning model. If the system is able to train an accurate machine learning model to accomplish the given task utilizing just the subset of features, then that subset can be considered relevant to the given task. In this way, the system can iterate through a predetermined list of sensitive data types, attempting to train a new machine learning model for each sensitive data type in order to determine which, if any, types of sensitive data might be vulnerable to exposure. Further, the system can determine, for each type of sensitive data, which features are most relevant to the sensitive data. The system can similarly determine which features are most relevant to the goal task, and thus can enable informed decisions regarding pruning the input data space.

Input data may include annotations. As an overview, annotations are essentially metadata that describe aspects of the data. For example, an input image of a person's face may include annotations including the depicted person's age, whether the person is smiling or not, the person's identity, etc. Annotations are useful in evaluating performance of models. For example, a machine learning model trained to identify whether person depicted in an image is smiling or not may produce an output, and a system may compare that output with known values stored in annotations in order to determine whether the model's output was correct or not. The model can then be adjusted based on the comparison, and the model may produce another output, and so on, until the model's output is consistently close to the known value. In this way, annotations describing the goal task can be useful in identifying features relevant to the goal task. Similarly, annotations describing sensitive information can be useful in identifying features relevant to sensitive information.

However, systems and methods consistent with the present disclosure do not require the input data to be annotated with sensitive information in order to determine vulnerable types of sensitive information and/or features relevant to sensitive information. This advantage enables protection of multiple types of sensitive data, including types that might not have otherwise been realized as vulnerable, against unknown malicious actors. For example, a prior system presented with input images including annotations describing emotion and gender of each depicted person might not be able to protect age data from being exposed, as the prior system might be unable to determine which features of the input images are relevant to age data (or even that age data is at risk in the first place).

FIG. 1 is a high-level method 100 for sensitive-data-aware encoding, consistent with several embodiments of the present disclosure. Method 100 comprises receiving an input data space at operation 102. For purposes of this disclosure, a "data space" may refer to raw input data (such as an image from a set of images, an audio recording, etc.), or a feature space (such as encoded features of the raw input data). An example input data space is depicted as space 202 in FIG. 2, discussed in further detail below. The data space may be utilized to train a machine learning model to accomplish a goal task. For example, the data space may be an image including a person's face, wherein the goal task may be to determine an emotion expressed by the person. The image may be received in a set of images of different faces. As another example, the data space may be a collection of text files, each including a film review. As noted, the data space may instead be a collection of features encoded from an image or set of images (or features encoded from a text file or set of text files, etc.), as opposed to the images themselves. For example, the data space may be an assortment of feature vectors, such as a first feature vector describing edges, a second feature vector describing curves, etc.

The goal task (and, therefore, the nature of the data space) may vary across different instances. For example, a goal task of transcribing speech to text might be accomplished by a model trained based on a data space including an audio recording. As another example, a goal task of classifying a sentiment of a film review might be accomplished by a model trained based on a data space including a text block of the film review.

Method 100 further comprises identifying vulnerable types of sensitive data at operation 104. In essence, operation 104 includes analyzing the input data space to determine if it might include sensitive information. As an example, operation 104 may include identifying that an input image of a person's face risks exposing that person's age. Operation 104 is explained in further detail below with reference to method 300 of FIG. 3, but as a brief summary, operation 104 may include inputting the received dataset into a machine learning model trained to determine a given type of sensitive information.

For example, a system performing method 100 may have access to a variety of existing machine learning models, including a model trained to evaluate a person's age based on an input image (an "age model"). An input data space may include an image depicting a person's face, and operation 104 may include submitting the input data space to the existing age model. The age model may output a predicted age or age range as well as a confidence value describing how confident the age model is in its prediction. For example, the age model may output "98% 30-40" indicating that it is 98% confident that the depicted person is between thirty and forty years of age. If the age model's confidence is above a threshold (e.g., 50%), an associated sensitive data type (i.e., "age") may be flagged as "vulnerable." In other words, if the age model is able to determine ages of people depicted in the images with a high degree of confidence, then "age" may be considered vulnerable sensitive data. If the age model is unable to determine ages with a high degree of confidence, then "age" may not be considered vulnerable sensitive data. For example, if the age model instead output "28% 30-40," indicating that it is 28% confident that the depicted person is between thirty and forty years of age (with no higher confidence of any other age range), then "age" may not be considered vulnerable sensitive data, as 28% is below the example 50% threshold.

This process may be repeated based on multiple different types of sensitive data (e.g., gender, etc.) to determine which types of sensitive data are vulnerable based on the input data space. For example, the same input data space may be input to a different model trained to evaluate a person's gender based upon an input image (a "gender model"). Similar to the age model, the gender model may output a predicted gender as well as a confidence value describing how confident the gender model is in its prediction. Based on the gender model's confidence value, "gender" may or may not be tagged as a vulnerable sensitive data type. As this is repeated with different models, a list of vulnerable sensitive types can be created and maintained.

In some instances, the input data space may include annotations describing sensitive information, in which case operation 104 may include attempting to train a machine learning model based upon the data space and determining an accuracy of the trained model.

Method 100 further comprises identifying features of the data space relevant to a goal task at operation 106. In essence, operation 106 may include attempting to determine which parts of the data space are most relevant to the goal task. For example, if the goal task is to determine whether a depicted person is smiling, operation 106 may include attempting to identify parts of the image that are particularly important for determining whether the depicted person is smiling. Operation 106 may include, for example, attempting to train machine learning models to perform the goal task based upon portions of the input data space.

In some instances, these portions can be feature "clusters," or groups. For example, operation 106 may include organizing features of an input image that describe curves in the image into clusters. In this example, a first cluster may include curves in an upper half of the image and a second cluster may include curves in a lower half of the image. Other types of clusters are also possible; for example, a third cluster may include curves above a particular threshold of "distinctiveness." "Distinctiveness" may describe a likelihood that the curves in the third cluster define a boundary (e.g., a wrinkle in a person's cheek, while a curve, is not a boundary, while the outline of the person's head is a boundary). Operation 106 may include organizing features of X into clusters via, for example, nearest neighbor searching, K-means clustering, Agglomerative Hierarchical Clustering, etc. For each cluster (and/or combinations of clusters), operation 106 may include attempting to train a different machine learning model based upon the feature cluster(s). Operation 106 may further include evaluating an accuracy of each machine learning model in order to determine whether the cluster resulted in an accurate model (which would imply that the cluster is relevant to the goal task).

As an example, a first model may be trained to determine whether a person depicted in an image is smiling or frowning based upon a first cluster of features of the image describing curves in the upper half of the image. The first model's results may be compared to annotations of the image (which describe whether the person actually is smiling or frowning) to determine an accuracy of the first model. Several images may be used to train the model and determine the accuracy of the model. For example, a first image may depict a first person and include annotations indicating that the first person is smiling in the first image. A second image may depict a second person and include annotations indicating that the second person is not smiling in the second image. A first model may receive features (including curves) in the upper half of the first image and incorrectly predict that the first person is not smiling. This prediction can be compared with the annotations of the first image to determine that the prediction is incorrect. The model may also receive features (including curves) in the upper half of the second image and incorrectly predict that the second person is smiling. This prediction can be determined to be incorrect in a similar fashion. An accuracy of the model can be calculated based upon a ratio of correct predictions to total predictions; in this example, this initial accuracy would be 0/2=0%, though in practice far more than two images may be used (for example, thousands or even millions). The model can be adjusted, whereafter the predictions can be performed again, and the accuracy can be recalculated. This process can be repeated until the model's accuracy stops improving. Notably, in this example, the first model may always be trained using features (including curves) in the upper half of any given input image.

Then, a second model may be trained in a similar manner to perform the same task based upon a second cluster of features, such as curves in the lower half of an image. The second model's results may similarly be compared to the annotations. As the clusters include features within the same data space (e.g., both clusters include curves in an image) and the models are being trained to perform the same task (e.g., determine whether the person is smiling or frowning), the clusters that are more relevant to the goal task are likely to result in more accurate trained models. Thus, the clusters associated with more accurate machine learning models may be identified as more relevant to the goal task. Put differently, two copies of the same model may be trained using different input features. The copy that, once trained, is more accurate may indicate that the features used to train that copy are more relevant to the goal task. Each cluster may be tagged, flagged, or otherwise noted as being relevant or irrelevant. For example, a cluster of features describing curves in an upper half of an image may be tagged as irrelevant, while a second cluster of features describing edges in the image may be tagged as relevant.

In some instances, feature clusters may be tagged with metadata describing the accuracy of associated models trained to perform the goal task (and/or the models trained to determine sensitive data). For example, the first model's trained accuracy may be 52% and the second model's trained accuracy may be 84%. This disparity may be because, for example, a lower half of an image is more likely to include a person's mouth, whose curves may be a strong indicator of whether the person is smiling. In such an example, the first cluster of features (including curves in the upper half of the image) may be tagged with metadata indicating that the first cluster of features is not relevant to determining whether a depicted person is smiling, while the second cluster of features (including curves in the lower half of the image) may be tagged with metadata indicating that the second cluster is relevant to determining whether a depicted person is smiling. As an additional example, the first cluster of features may be utilized, at operation 104, as input to a third machine learning model to predict a person's age with a confidence of 75%. Thus, the first cluster of features may be tagged to indicate "age: 75%" and "goal task: 52%." In some instances, the third machine learning model may be configured to receive an input formatted differently from the first cluster of features (e.g., the third machine learning model may be configured to receive feature clusters that have also been processed in a certain way), and therefore the first cluster of features may be modified to ensure compatibility.

Method 100 further comprises pruning, at operation 108, the input data space based on the identified features, resulting in a pruned subspace. Operation 108 may include, for example, removing all clusters of features except those tagged as relevant to the goal task. This may result in removal of features that provide little or no benefit to performance of the goal task (i.e., features that are not relevant to the goal task), some of which may be relevant to sensitive data types as well. Features that are not particularly relevant to either the goal task or any sensitive data types may also be removed. In some embodiments wherein clusters of features may be identified as relevant to sensitive information, operation 108 may include only removing clusters of features that are relevant to sensitive information (e.g., features that are irrelevant to sensitive information may be retained, even if they are not particularly relevant to the goal task, either). In some instances, features may "overlap"; the same cluster of features may be relevant to both the goal task and sensitive data. Whether such overlap features are removed or retained can depend upon embodiment/use case, as discussed in further detail below.

As a first example, a data space may include three clusters "A," "B," and "C." Clusters A and B may both independently be sufficiently relevant to a goal task such that only one of A and B is needed to perform the goal task above a target accuracy. Clusters B and C may both be relevant to sensitive information; for, example a trained age model may be able to determine a depicted person's age with an unacceptably high confidence with either of B or C (or both). In such an example, operation 108 may include pruning the data space to remove clusters B and C, leaving only cluster A in the pruned subspace. This way, the goal task can still be performed, and sensitive information is protected. Notably, keeping cluster B in the pruned subspace in addition to cluster A may improve performance of the goal task, but in some instances, cluster A may be sufficient.

As a second example, a data space may include four clusters "A," "B," "C," and "D." Cluster A may be relevant to the goal task and irrelevant to sensitive information but may not be sufficient alone to yield satisfactory performance of a model trained solely with cluster A. For example, the goal task may include a goal accuracy threshold, describing an accuracy required of a trained model, such as 95%. In other words, if the trained model is unable to correctly perform the goal task with a 95% accuracy (or greater), then the trained model is considered inadequate. Cluster A may, if used alone, result in a trained model with an accuracy of 90%. Therefore, cluster A may not be sufficient alone. Clusters B and C may both be relevant to both the goal task and sensitive information, and cluster D may be relevant to sensitive information but not the goal task. In such an example, operation 108 may include pruning the data space to remove cluster D, retain cluster A, and retain at least some of clusters B and C to be able to train a model to perform the goal task with sufficient accuracy. For example, the pruned subspace may include all of cluster A, half of cluster B, half of cluster C, and none of cluster D. As another example, the pruned subspace may include all of cluster A, two thirds of cluster B, none of cluster C, and none of cluster D. The exact decisions on how much of clusters B and C can vary based on use case; for example, if the sensitive information is considered not particularly critical, then more of clusters B and C may be retained to improve accuracy in performance of the goal task. If the sensitive information is critical, then only enough of B and C may be retained to reach the minimum requirement of accuracy.

If the goal task accuracy requirement cannot be met without compromising sensitive information, a user may be notified and prompted to decide how to proceed. For example, sensitive information may be associated with a sensitivity threshold, which may vary by type of sensitive information (e.g., age vs. gender) and/or by classification of sensitive information (e.g., sensitive vs. critically sensitive). For example, age may have a sensitivity threshold of 70%, meaning an age model being able to predict a depicted person's age with a confidence of 70% (or greater) means age information is unacceptably compromised by the data space.

In some embodiments, feature clusters may be pruned based upon user input. For example, a user may be presented with a list of vulnerable sensitive data types, such as those identified at operation 104. The user may be enabled to select which (if any) sensitive data types to protect, causing a system to prune the data space to remove features relevant to the selected types. This is discussed in further detail below with reference to method 600 of FIG. 6. In some embodiments, pruning may be performed automatically based on various comparisons and criteria. For example, any features relevant to a sensitive data type and irrelevant to the goal task may automatically be pruned.

In some instances, features relevant to the sensitive data may also be relevant to the goal task. Those features which are relevant to both sensitive data and the goal task are referred to as "overlap" features (or "overlap clusters"). For example, a cluster of features describing curves in a lower half of an image may be relevant to both a goal task of determining whether a person is smiling as well as a sensitive data type of "age." In such an instance, the cluster is an overlap cluster. In some instances, all clusters could possibly be overlap clusters.

In some instances, overlap clusters may be pruned or retained based on user input, as described in further detail below with reference to method 600 of FIG. 6. In such instances, lax criteria for designating a cluster as an "overlap" cluster may result in an overwhelming amount of overlap clusters being presented for user input. Thus, in some instances, only clusters with a relevance above a particular threshold (e.g., 60%) to both a sensitive data type and a goal task are considered overlap clusters.

In some instances, operation 108 may require at least one cluster of features be kept in the pruned data space even if all clusters meet criteria for removal. In some instances, a system performing method 100 may, upon detecting that all clusters meet removal criteria, notify a user and request input regarding how to proceed. This may be advantageous in instances where, for example, all clusters are irrelevant to the goal task, as it may indicate to the user that the entire data space is unhelpful (at which point the user may opt to acquire a different data space or simply not to proceed, etc.).

Removing an overlap cluster of features will generally enhance protection of the sensitive data but may also hinder accuracy of the goal task. Different implementations may have different priorities; for example, a first developer may prioritize accuracy of the model above all else, and therefore retain overlap clusters. A second developer may prioritize security of sensitive information, and therefore remove overlap clusters. Thus, the pruning at operation 108 may vary depending upon implementation, as discussed in further detail in the following examples.

The pruned subspace may be sent to a provider at operation 110. When the pruned subspace is sent to a provider at operation 110, the pruning of operation 108 can enable a system performing method 100 to protect the associated sensitive data even if the transmitted data is intercepted by a malicious actor. For example, a malicious actor may intercept the pruned subspace (transmitted at operation 110) and attempt to determine sensitive data from the pruned subspace by using an unknown machine learning model (e.g., a machine learning model that a system performing method 100 may not have access to or be aware of). However, as features relevant to the sensitive data may be absent from the pruned subspace, the malicious actor may be unable to determine the sensitive data, or at least hindered (i.e., an accuracy and/or confidence of the malicious actor's model may be reduced).

In some instances, operation 110 may include encoding the pruned subspace and then sending the encoded subspace to the provider. As discussed above, method 100 may utilize raw (i.e., unencoded) input data or an encoded set of features. For example, the input data space received at operation 102 may be an image or may be a vector of encoded features generated from the image. Similarly, operation 104 may include inputting the raw image to pretrained models or inputting the encoded features to pretrained models (some models may be configured to receive unencoded image data, while others may be configured to receive encoded features; typically, models receiving unencoded data will encode the data as a first step). Operation 106 may also utilize raw image data to train models (e.g., a first model may be trained based on an upper half of the image rather than a cluster of features including curves in the upper half of the image, etc.), and operation 108 may include pruning an image instead of a feature vector (e.g., a system might crop out an upper half of an image rather than remove a cluster of features describing curves in the upper half of the image, etc.). However, when transmitting data to a Machine Learning as a Service (MLaaS) provider, it may be beneficial to ensure that the data is encoded. While even encoded data can still expose sensitive information, as described throughout this disclosure, transmitting encoded data may be preferable to transmitting unencoded data, as leaking unencoded data may be considered more harmful (e.g., a leaked image may be more problematic than a leaked vector of encoded features describing the image). Thus, in instances wherein operations 102-108 include use of unencoded data, operation 110 may include encoding the data into features prior to transmission.

As described above, feature clusters may "overlap" and be relevant to both a goal task and sensitive information, which can result in a dilemma when deciding whether to remove the features or retain them. As an example, the overlap cluster may be included in or removed from a data space based upon a comparison of how relevant the cluster is to the goal task vs. how relevant the cluster is to the sensitive data (such as a "relevance difference"). For example, the overlap cluster may be used to train a machine learning model to accomplish the goal task with an accuracy of 90%, making that overlap cluster "90% relevant to the goal task." At the same time, that overlap cluster may be used by another machine learning model to identify sensitive features with an accuracy of 83%, making the overlap cluster "83% relevant to sensitive data." This may result in a relevance difference of 7%. This difference may be compared to a difference threshold (e.g., −10%, 0%, 15%, etc.) in determining whether to keep or omit the cluster in the data space. A difference threshold of 0% essentially considers whether the overlap cluster is more relevant to the sensitive data or the goal task. Difference thresholds above 0% may be desirable to ensure that the overlap cluster is more relevant to the goal task than sensitive data by a particular margin, but may result in omitting useful features. For example, an overlap cluster with a 99% goal relevance value but a 95% sensitive relevance value, having a relevance difference of 99%−95%=4%, might be pruned by a system enforcing a difference threshold of 5%. Difference thresholds below 0% may also be useful, such as in instances where accuracy is particularly important and protection of sensitive data is a secondary goal (i.e., less important than accuracy, but still desirable). For example, a difference threshold of −30% may result in pruning an overlap cluster with a goal relevance of 60% and a sensitive relevance of 95% (a relevance difference of 60%−95%=−35%), which a developer may consider only barely relevant to the goal task while placing sensitive information at significant risk. However, if that same overlap cluster had a goal relevance of 70% and a sensitive relevance of 95%, the overlap cluster would have a relevance difference of −25%, and thus would not be pruned by a system utilizing a −30% difference threshold.

In some instances, an overlap cluster may be relevant to multiple sensitive data types (and/or multiple goal tasks, if applicable). For example, the overlap cluster may be 93% relevant to a first sensitive data type (e.g., "age,"), 62% relevant to a second sensitive data type (e.g., "gender,"), and 85% relevant to the goal task (e.g., "emotion"). In such an example, the overlap cluster may be tagged with three relevance values: A first sensitive relevance value of 93% for "age," a second sensitive relevance value of 62% for "gender," and a goal relevance value of 85% for "emotion." In such a situation, a system performing method 100 may compare the goal relevance value (in this example, 85%) to a sum of the sensitive relevance values (in this example, 93%+62%=155%), a largest of the relevance values (in this example, max(93%, 62%), or an arithmetic mean of the relevance values (in this example, (93%+62%)/2= 72.5%), =93%). Other comparisons are also possible (e.g., weighted sum, statistical mode, median, etc.).

In some instances, relevance values may be weighted based upon expected accuracy of random selection for a given task. For example, a model performing a binary classification task (e.g., yes or no) where each option is equally likely may be expected to have a minimum accuracy of 50%, and thus a cluster of features with a relevance value of 50% (meaning a model trained to perform the task based upon the cluster has an accuracy of 50%) may be considered of low relevance, as it implies the associated cluster of features provide no help at all to a model trying to perform the task. In view of this, the relevance value of 50% may be weighted in view of the expected random accuracy. As a simple example, a difference between the unadjusted relevance value and the expected random accuracy may be utilized (e.g., the weighted relevance may be [unadjusted relevance]−[expected random accuracy]=50%−50%=0), representing that the associated cluster is of no relevance to the goal task. In contrast, for a task with tens of thousands of equally likely possible outcomes, only one of which is correct, an expected random accuracy may be low (e.g., 0.00002%), resulting in a weight of 50%−0.00002%~50), and thus the weighted relevance value of 50% may be significant. Other forms of weighting are also considered. Based upon results of the comparison, a system performing method 100 may remove the overlap cluster or retain it.

Each comparison may be useful depending upon use case. For example, comparing the goal relevance value to the sum of all sensitive relevance values might result in more aggressive pruning of features, which may be recommended for a particularly sensitive application, and/or where goal task accuracy is less important to a developer/user than sensitive data protection. However, as additional sensitive data types are evaluated, the sum may continue to increase without limit, which might result in fewer (or even no) feature clusters meeting criteria for inclusion in the pruned data space. In contrast, comparing the goal relevance value to the greatest sensitive relevance value may serve as a cutoff to ensure that the overlap cluster is not particularly relevant to any given sensitive data type.

As an additional consideration, each sensitive data type may be categorized or ranked depending upon its criticality. Further, each sensitive relevance value may be weighted based upon the type of sensitive data it is relevant to. As an example, "medical data" may be categorized as "sensitive: critical," wherein any relevance value for "medical data" may be multiplied by a weight factor of 1.5 before the comparisons described above are performed. As an additional example, "place of employment" may be categorized as "sensitive:standard," wherein any relevance value for "age" may be multiplied by a factor of 1.15 before the comparisons describe above are performed. Systems and methods consistent with the present disclosure may further enable users to select, modify, and/or remove categorizations and their associated weights to enable application-specific encoding. For example, a user developing a machine learning model based on training data acquired in a hospital setting (e.g., a set of photographs taken of patients upon intake) may adjust a weight of the "medical data" category from 1.5 to 2.5, resulting in even stricter pruning of features that might risk exposing medical information.

In some instances, systems and methods consistent with the present disclosure can further enable users to add new types of sensitive data. For example, a user may include a set of annotated examples to train a model to identify a given new sensitive data type. The trained model can then be used with the input data space (or various subspaces) to determine relevance values for the new sensitive data type.

In some instances, operation 108 may include removing all clusters of features that are not tagged as relevant to the goal task, or whose goal relevance values are below a particular threshold (e.g., 65%). This can be beneficial for several reasons, as discussed in further detail below with reference to FIG. 7.

Figure 2:
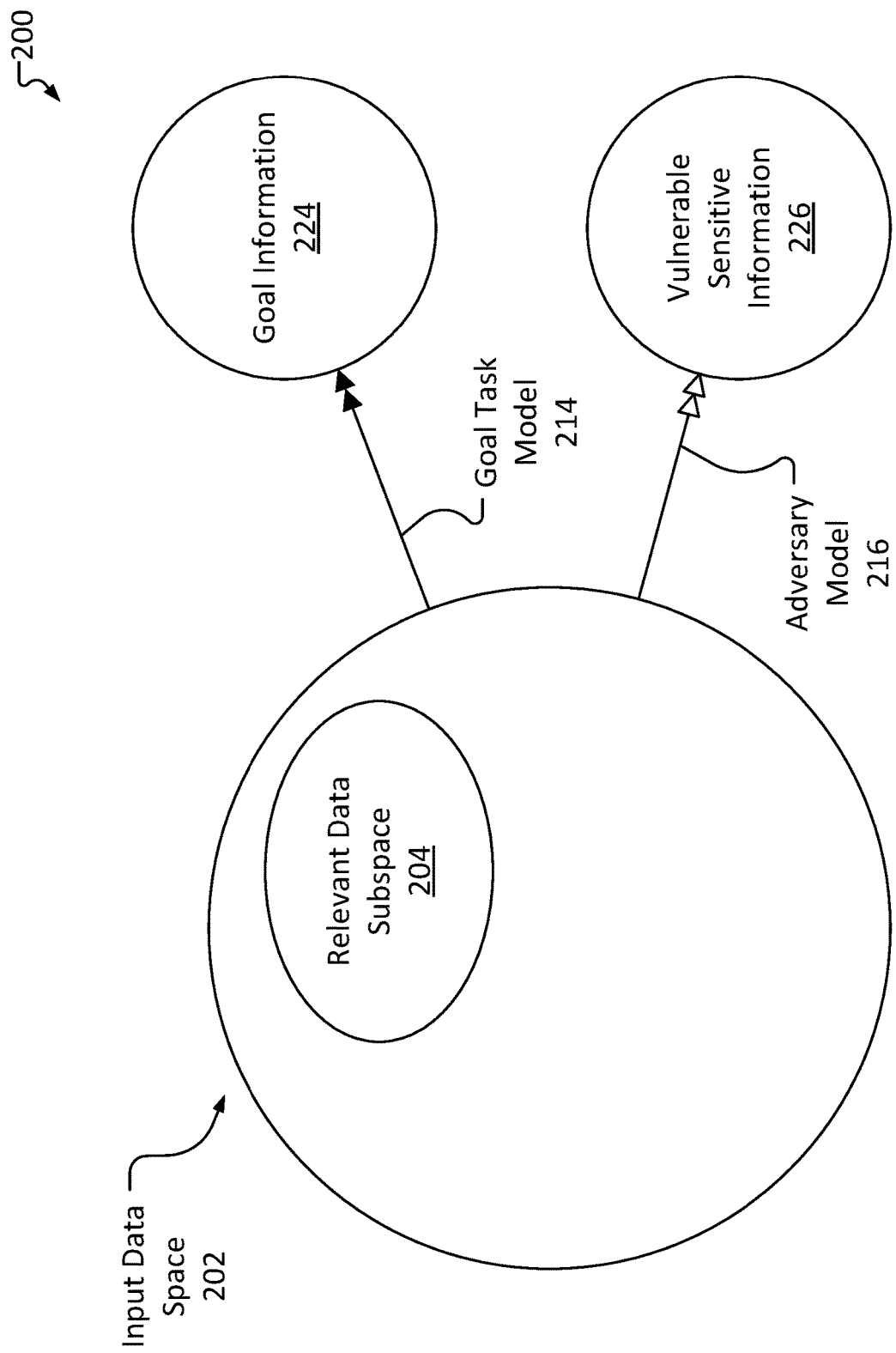
FIG. 2 is a schematic diagram of a simple example system depicting an information space of an input for encoding, consistent with several embodiments of the present disclosure.

FIG. 2 is a schematic diagram 200 depicting an information space 202 of input data, consistent with several embodiments of the present disclosure. Input data space 202 includes a subspace 204 of data relevant to a goal task 224. A developer may intend to utilize data space 202 to train a machine learning model 214 to accomplish a goal task, such as identifying goal information 224. However, an adversary model 216 can utilize input data space X to determine vulnerable sensitive information 226. In order to protect vulnerable sensitive information 226, systems and methods consistent with the present disclosure may identify a subspace 204 of features relevant to the goal task 224. Subspace 204 can be encoded and transmitted rather than the entirety of input space 202. This can reduce the amount of data/features that are available to a malicious actor, such that sensitive data 226 may be more difficult to ascertain.

For example, goal information 224 may be a classification, such as a classification of whether a person is smiling. An input data space 202 may be an image, a vector of features of the image, or both. The features of the data space can be analyzed via a model 214 (such as a machine learning model) to reveal goal information 224. However, many of the features of data space 202 may not be particularly helpful in determining goal information 224. Simultaneously, some features of data space 202 may be useful in determining vulnerable sensitive information 226 via adversary model 216. Thus, cropping or pruning data space 202 to remove features that are not relevant to goal information 224 can also remove features that are useful for determining vulnerable sensitive information 226, improving security of vulnerable sensitive information 226. Therefore, a system may identify a subspace (i.e., a subset) of data space 202 including features relevant to goal information 214, referred to as relevant subspace 204. The system may then transmit just relevant subspace 204, rather than the entirety of data space 202. This way, model 214 may still reliably determine goal information 224, because relevant subspace 204 includes features relevant to goal information 224, but adversary model 216 may not be able to determine sensitive information 226. In other words, the sensitive data is protected, and the goal task can still be accomplished. As an added benefit, so long as at least some parts of data space 202 are pruned, subspace 204 is necessarily smaller than data space 202, so transmitting the pruned subspace 204 consumes less bandwidth than transmitting all of data space 202.

Figure 3:
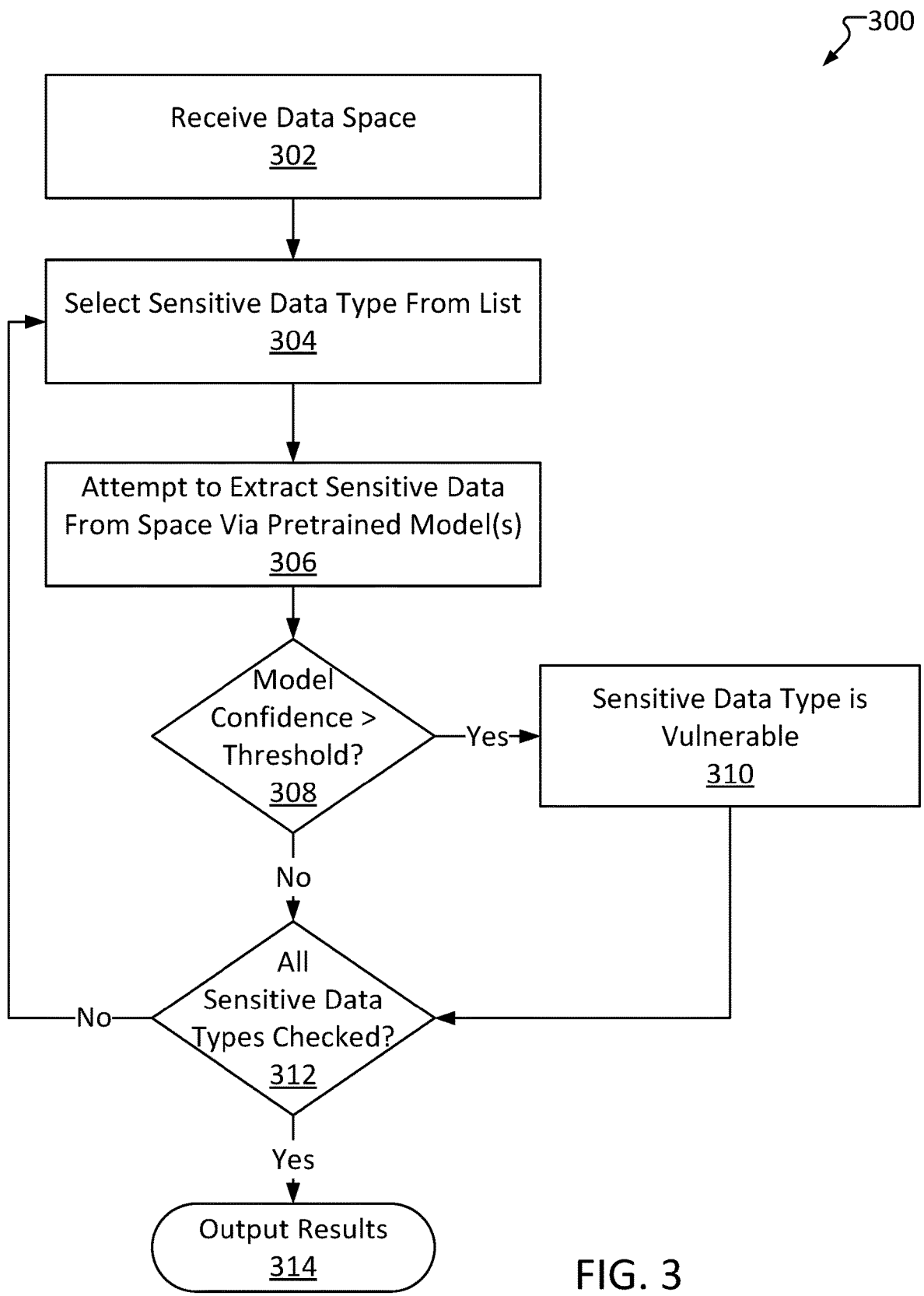
FIG. 3 is a method for determining vulnerable sensitive data types based upon clusters of features of an input data space, consistent with several embodiments of the present disclosure.

FIG. 3 is a method 300 for determining vulnerable sensitive data types based upon clusters of features of an input data space, consistent with several embodiments of the present disclosure. Method 300 comprises receiving a data space at operation 302. Operation 302 may include, for example, receiving an image that a developer may wish to send to a machine learning as a service (MLaaS) provider. Operation 302 may be performed in a substantially similar manner as operation 102 of method 100.

Method 300 further comprises selecting a sensitive data type from a list at operation 304. A system performing method 300 may have access to a predetermined list of sensitive data types, wherein the system may select one of the types at operation 304. In some instances, the list may be generated based on user input, enabling a user of a system performing method 300 to check for vulnerable sensitive data types of particular concern to the user. In some instances, the list may be based on a number of available machine learning models. As each type of sensitive data can be checked for vulnerability based upon a model trained to extract that type of sensitive data (as discussed in further detail below with reference to operation 306), a list of available machine learning models may constitute a list of sensitive data types that the system performing method 300 can be expected to evaluate. For example, a system performing method 300 may have access to three trained models; one to determine age, one to determine gender, and one to determine an address. In such an example, the system may, at operation 304, select a first type (e.g., "age") from the list. However, a list of sensitive data types based solely on available models is not necessarily exhaustive; other possible ways of identifying vulnerable sensitive data types without preexisting models are also considered, such as attempting to train a new machine learning model to extract sensitive data of a given type (utilizing a received data space including annotations describing the given type as training data), similar to performing operation 106 of method 100 with a "goal task" of identifying sensitive data of the given type. Further, models that are not currently available may become available at a later time.

Method 300 further comprises attempting to extract sensitive data from the data space via one or more pretrained models at operation 306. Operation 306 may include, for example, inputting the data space received at operation 302 to an existing machine learning model and receiving an output from the model. For example, a system performing method 300 may have selected, at operation 304, "age" as a sensitive data type. In such an example, the system may, at operation 306, input the data space into a model that has been trained to extract age information and receive an output from the model. The received output may include a "confidence" value, representing the model's confidence that the output age is correct.

Method 300 further comprises comparing the confidence to a confidence threshold at operation 308. The confidence threshold may be preset. For example, in some instances, operation 308 may include checking if the model confidence is above 50%. If the confidence is above the confidence threshold (308 "Yes"), method 300 further comprises flagging the selected sensitive data type as "vulnerable" at operation 310. As an example, if a pretrained age model is able to confidently identify age based upon a received image, then an adversary intercepting the image is likely also capable of extracting age information. Thus, the image risks exposing age data; in other words, the age data is "vulnerable." Operation 310 may include, for example, adding the sensitive data type to a list of "vulnerable" types (or creating such a list if none exists).

Once the sensitive data type is flagged as vulnerable (e.g., added to a list, tagged with metadata, etc.), method 300 further comprises determining whether all sensitive data types of the list have been checked at operation 312. If not all sensitive data types have been checked (312 "No"), method 300 further comprises returning to operation 304 to select a type that has not yet been checked, and operations 304-312 are repeated. In essence, this results in iterating through the list of sensitive data types, checking each for vulnerability.

If the model confidence checked at operation 308 is below the threshold (308 "No"), the sensitive data type is not vulnerable. In some instances, sensitive data types may be flagged as "not vulnerable" or "secure" in a manner similar to operation 310. In other instances, once the confidence is determined to be below the threshold, method 300 proceeds directly to operation 312.

At some point in operations 304-312, a selected type of sensitive data is designated as being "checked," enabling the determination at operation 312. Once all sensitive data types have been checked via operations 304-312 (312 "Yes"), method 300 further comprises outputting results at operation 314. Operation 314 may include, for example, presenting a list of vulnerable sensitive data types flagged via operation 310 to a user (such as via a display). A list of vulnerable sensitive data types may be presented in comparison to those checked; for example, the list utilized at operation 304 may be presented at operation 314, but sensitive data types that were determined to not be vulnerable may be grayed out, crossed out, omitted, etc., and/or those that have been found vulnerable may be boldened, underlined, etc.).

Figure 4:
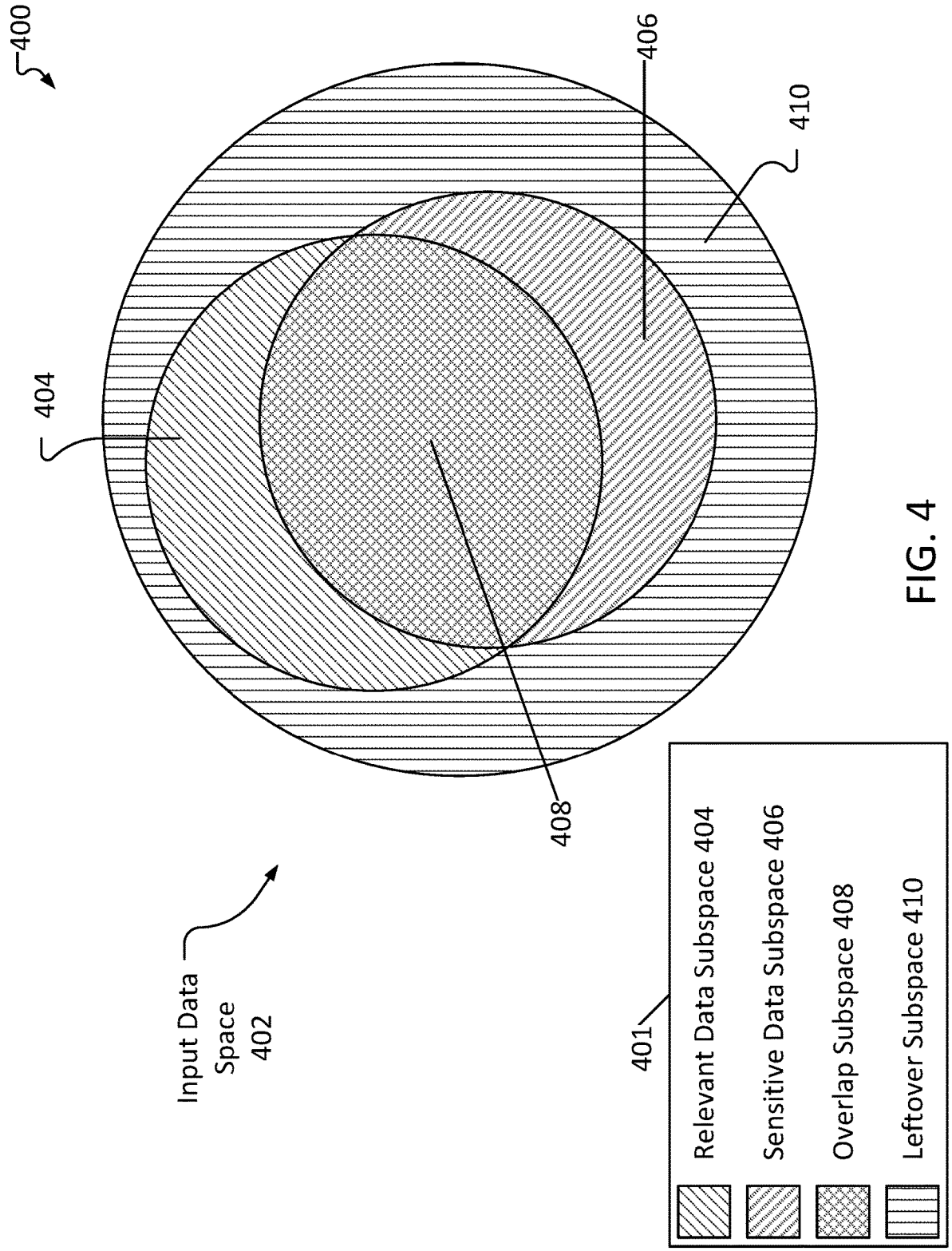
FIG. 4 is a schematic diagram of an example system depicting information spaces including a goal-relevant data subspace and a sensitive data subspace, consistent with several embodiments of the present disclosure.

FIG. 4 is a schematic diagram 400 depicting information spaces including a goal-relevant data subspace 404 (also referred to as a "goal subspace") and a sensitive data subspace 406 (also referred to as a "sensitive subspace"), consistent with several embodiments of the present disclosure. Input data space 402 includes multiple subspaces, denoted by hashing as detailed in legend 401. In particular, input space 402 includes goal-relevant data subspace 404, sensitive data subspace 406, overlap subspace 408, and leftover subspace 410. Just as data space 402 may be raw input data (such as an image) or a feature space (such as encoded features of the image), data subspace 404 can be a subset of raw input data (such as a specific region of an image) or a feature subspace (such as a particular set of encoded features of the image, or encoded features of a specific region of the image).

Goal-relevant data subspace 404 may be a cluster of features that are correlated with successful performance of a goal task (e.g., features having a particularly high relevance value to successful performance of a goal task, as described above with reference to operation 108 of method 100). For example, goal-relevant data subspace 404 may include features that are determined to be relevant to identifying whether a person depicted in an image is smiling. Goal-relevant data subspace 404 may include a set of values of a single type of feature or sets of values of several different kinds of features. As an example, the goal task may be a classification of whether or not a person in an image is smiling (wherein input data space 402 may be a raw image or a set of encoded features of the image). In such an example, goal-relevant data subspace 404 may include features such as curves and/or edges in an image, shape of a depicted person's eyes, boundary of a person's face, etc. When utilizing goal-relevant data subspace 404 as an input, goal task model 414 may be able to accurately accomplish a goal task. In order to train goal task model 414, a developer may wish to utilize some or all of subspace 404 as input.

Sensitive data subspace 406 may be a cluster of features that are correlated with sensitive information (e.g., features having a particularly high relevance value to sensitive information). Sensitive data subspace 406 may be identified via, for example, operation 104 of method 100. As with goal-relevant data subspace 404, sensitive data subspace 406 may include a set of values of a single type of feature or sets of values of several different kinds of features. The sensitive information may be, for example, an age of a person depicted in an image (wherein input data space 402 may be the raw image or a set of encoded features of the image). In such an example, sensitive data subspace 406 may include features such as curves and/or edges in an image, color of a depicted person's hair, density of the person's hair, etc. When utilizing sensitive data subspace 406 as an input, an adversarial model may be able to accurately identify the sensitive information. When training the goal task model, a system may wish to protect sensitive information, and may therefore omit some or all of sensitive data subspace 406.

Notably, in the examples described above, both goal-relevant data subspace 404 and sensitive data subspace 406 include "curves and edges" features. Such features, being a part of both subspaces, are represented in FIG. 4 as overlap subspace 408. For clarity, for purposes of this disclosure, both relevant data subspace 404 and sensitive data subspace 406 are considered to include overlap subspace 408 (for example, relevant data subspace 404, as depicted in FIG. 4, has an elliptical shape, not a crescent-moon shape). In some instances, there may be no overlap between subspaces 404 and 406 (i.e., overlap subspace 408 may be a null set).

Overlap subspace 408 includes features that are relevant to both goal information and sensitive information. Thus, a model may perform a goal task better if all of subspace 404 were input to the model, rather than only the portion of subspace 404 without overlap subspace 408. However, while the goal task model may have superior performance, the transmission may place sensitive information at greater risk of exposure, as a malicious actor intercepting the transmission may have more useful inputs for an adversarial model. Thus, a developer may opt to exclude part or all of overlap subspace 408 in a transmission to an external provider depending upon several factors. For example, if the sensitive information is particularly important (e.g., health information, personally identifying information (PII) such as a person's address, etc.), the developer may decide that omitting some or all of overlap subspace 408 is preferable. On the other hand, if the goal task is of particular importance (e.g., related to healthcare diagnostics, security, etc.), then the developer may wish to maximize performance of the goal task model by including more (or even all) goal-relevant features regardless of risk. In instances where both accuracy and protection of sensitive information are considered paramount, a balancing test may be performed to determine which (if any) portions of overlap subspace 408 should be included. For example, accuracy benefits of including the subspace may be compared against exposure of sensitive information. In some embodiments, systems and methods consistent with the present disclosure may be configured to automatically determine which subspaces to transmit.

In some instances, overlap subspace 408 may be required to meet a minimum accuracy target for performance of a goal task. In other words, the portion of subspace 404 excluding subspace 408 may be insufficient to train a model to a given specification. In some such instances, some or all of subspace 408 may be retained, despite the risk of exposing sensitive information. In some instances, such a risk may be mitigated by adding noise to replace the portion of subspace 406 that was removed (i.e., the portion not including subspace 408). This noise may essentially serve to trick a malicious model, hindering its ability to correctly extract sensitive information. This is discussed in further detail below with reference to FIG. 8 and FIG. 9.

Leftover subspace 410 includes all features that are not considered particularly relevant to either goal task 424 or sensitive information 426. For example, leftover subspace 410 may include any features that have an identified relevance value below 55%. In some instances, this may be a weighted reference value; as the relevance value is determined based on an accuracy of a model, an of 50% in the context of a "yes-or-no" determination (such as a determination of whether a person in an image is smiling) is on par with random chance. Thus, a relevance value of 50% may essentially represent that the features have no impact on such a determination, while a relevance value below 50% may indicate that the features are actively harmful (i.e., are misleading) to a determination. In some instances, leftover subspace 410 may be included in a transmission as it may still provide a boost to performance of goal model 414, though minor. However, in some instances, leftover subspace 410 may be omitted, as it may similarly provide a minor increase in exposure of sensitive data 426. Further, omission of leftover subspace 410 has an additional benefit of decreasing transmission size, and can also result in reduced training time (and, therefore, MLaaS costs).

Figure 5:
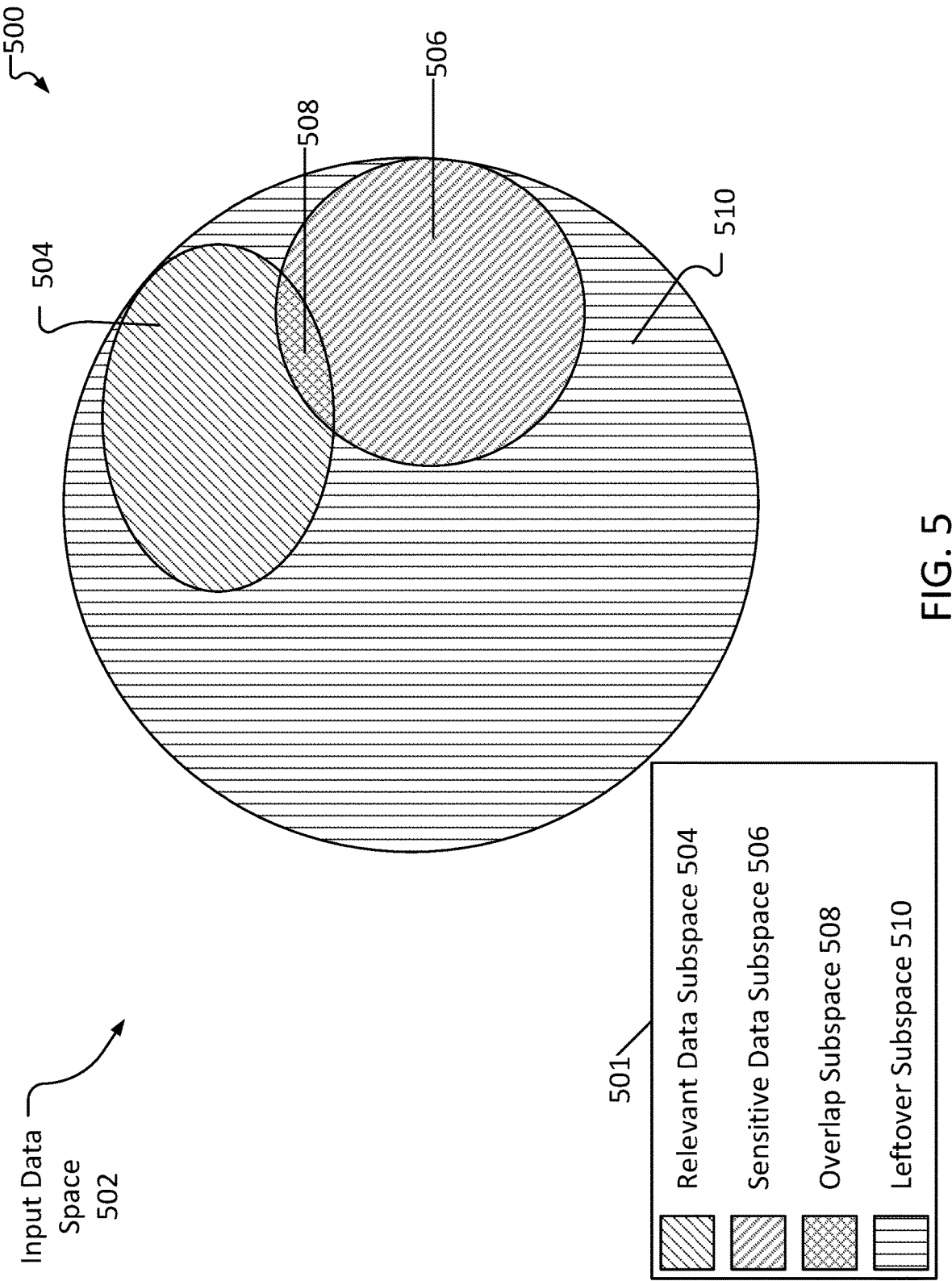
FIG. 5 is a schematic diagram of an additional example system depicting information spaces including a relevant data subspace and a sensitive data subspace, consistent with several embodiments of the present disclosure.

FIG. 5 is a schematic diagram 500 depicting additional example information spaces including a goal-relevant data subspace 504 and a sensitive data subspace 506, consistent with several embodiments of the present disclosure. Schematic 500 is provided to illustrate an additional example of the data spaces utilized in several embodiments of the present disclosure. Thus, at a high level, schematic diagram 500 may appear to be substantially similar to schematic diagram 400 of FIG. 4, including input space 502, leftover subspace 510, etc. However, goal-relevant data subspace 504 and sensitive data subspace 506 have a noticeably smaller overlap subspace 508 when compared to overlap subspace 408 of FIG. 4. This may be due to several factors. For example, input data space 502 may be different from input data space 402 (e.g., a different image), and thus feature subspaces of input data space 502 may be different. Further, a goal task to be accomplished based on data space 502 may be different from the goal task to be accomplished based on data space 402, wherein different features may be most relevant. For example, the goal task to be accomplished based on data space 502 may be to determine a number of unique speakers, wherein input data space 502 may be an audio recording. In such an example, goal-relevant data subspace 504 may include features describing which portions of the input recording are spoken words. Similarly, sensitive information that may be exposed by data space 502 may be different from sensitive information that may be exposed by data space 402.

Figure 6:
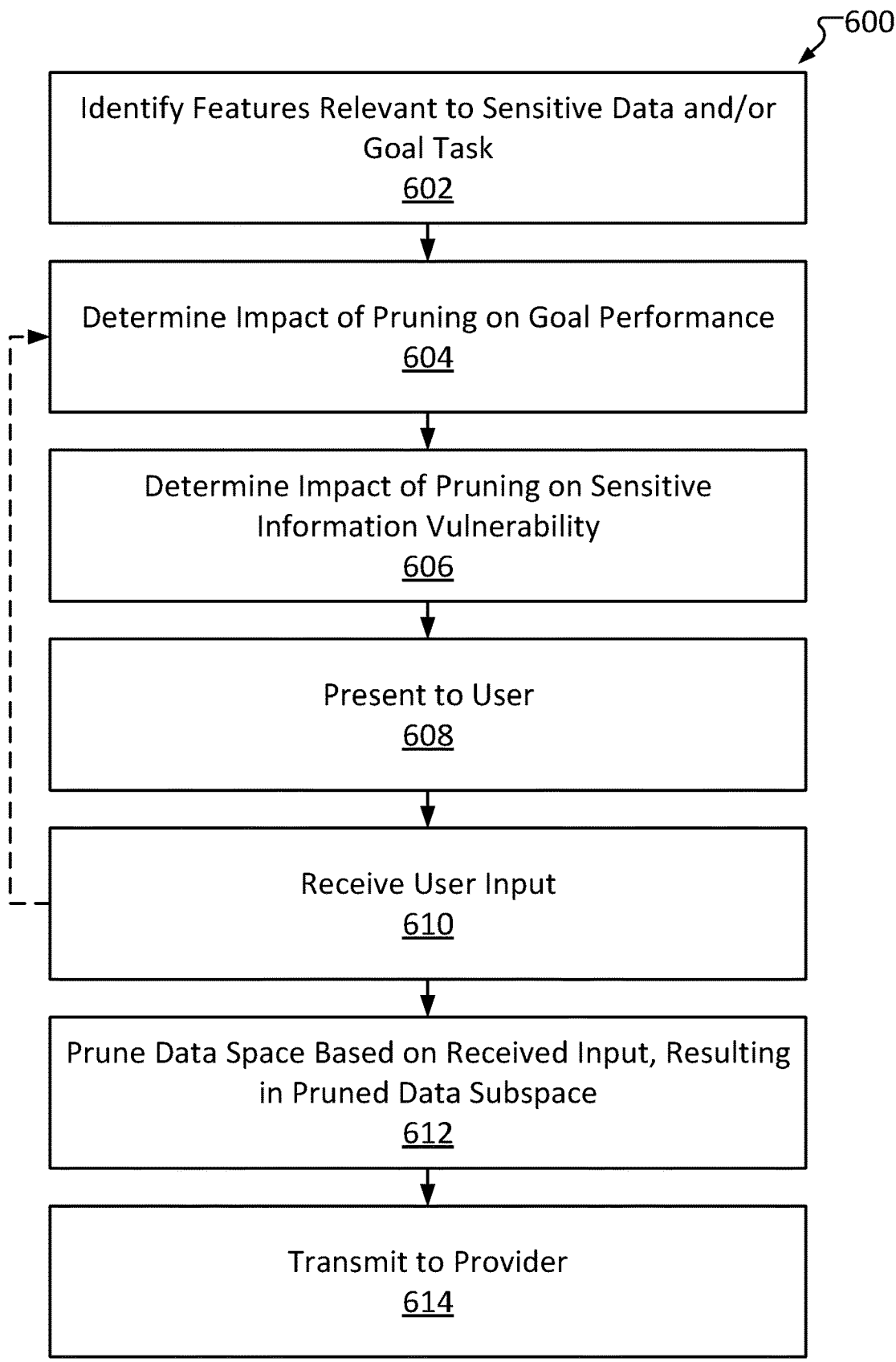
FIG. 6 is an example method for pruning an information space based upon user input, consistent with several embodiments of the present disclosure.

FIG. 6 is an example method 600 for pruning an information space based upon user input, consistent with several embodiments of the present disclosure. Method 600 comprises identifying features relevant to sensitive data and/or a goal task at operation 602. Operation 602 may include, for example, iteratively evaluating features of an input data space to determine relevance values for each feature. Operation 602 may be performed in a substantially similar manner as operations 104-106 of method 100 as described above with reference to FIG. 1. As a result of operation 602, a list of features (or clusters of features) may be compiled, including a goal relevance value (describing how relevant the features are to performance of a goal task) and a sensitive information relevance value (describing how relevant the features are to sensitive information). For example, operation 602 may include determining that a first feature cluster (e.g., shape of eyes of a person in an image) is relevant to the goal task (e.g., expression classification) but irrelevant to sensitive information (e.g., age), having an example goal relevance value of 92% and an example sensitive information relevance value of 17%. In other words, an example model trained based on the first feature cluster may have a 92% accuracy in classifying an expression but only 17% accuracy in identifying an age of a person. A second feature cluster (e.g., hair density) may be identified at operation 602 as irrelevant to the goal task but relevant to sensitive information, having an example goal relevance value of 2% and an example sensitive information relevance value of 75%. A third feature cluster (e.g., edges and curves) may be identified at operation 602 as relevant to both the goal task and the sensitive information, having an example goal relevance value of 87% and an example sensitive information relevance value of 81%.

Method 600 further comprises determining an impact of pruning features on performance of a goal task at operation 604. Operation 604 may include, for example, comparing predicted accuracy of a model trained on the entire data space to that of a model trained only on subspaces that are not relevant to sensitive information. In essence, operation 604 may result in determining how much of a performance penalty may be expected from removing sensitive information. For example, the second feature cluster (hair density) may not have any significant relevance to performing the goal task of classifying emotion, as the second feature may have a goal relevance value of approximately 2% (in other words, a model trained to accomplish the goal task based on the second feature cluster may have an accuracy of approximately 2%). Thus, pruning (i.e., removing) the second feature cluster from the data space may have a negligible impact on overall accuracy of a model being trained to accomplish the goal task. In contrast, the third feature cluster (edges and curves) may have a significant relevance to the goal task, as the third feature cluster may have a goal relevance value of approximately 83%. Thus, pruning the third feature cluster from the data space may result in a significant performance penalty for the model, although it may also result in improved security of the sensitive data. Operation 604 may include, for example, applying a penalty to a default accuracy value based upon goal relevance values of feature clusters that are slated for removal. As an example, a model trained on the entire input data space may have an accuracy of 98%, as the model has access to every cluster of relevant features (e.g., the first and third). However, removal of the third cluster of features may result in a reduced accuracy to a resulting model. This penalty may be determined based on a comparison of the removed cluster's relevance values to those of the remaining clusters. For example, removal of the most relevant feature cluster may have a more significant penalty to overall accuracy than removal of the second-most relevant feature cluster, while removal of the least relevant feature cluster may have little to no impact on overall accuracy (i.e., the penalty may be close to zero).

Method 600 further comprises determining an impact of pruning on sensitive information vulnerability at operation 606. Operation 606 may be performed in a similar manner as operation 604, but using sensitive information relevance values instead of goal relevance values and an overall confidence instead of overall accuracy. For example, operation 606 may include comparing a confidence value of a pretrained model trained to extract sensitive information (such as one determined via operation 306 of method 300) based upon an entire data space to that of a pruned subspace. As feature clusters that are relevant to sensitive information are pruned, vulnerability of sensitive information decreases.

Method 600 further comprises presenting feature information to a user at operation 608. Operation 608 may include, for example, presenting the feature clusters identified at operation 602 and the accuracy impacts of pruning sensitive feature clusters at operation 604. Operation 608 may include causing a display device to display information, causing speakers to emit sound, transmitting a notification to a mobile device, etc. In some instances, operation 608 may include presenting a schematic diagram such as, for example, schematic diagram 400 or 500.

Operation 608 may include presenting metadata describing evaluated features, such as relevance values of the features. As discussed above, a relevance value of a feature is based on an accuracy of a model trained to accomplish a task when the model receives the feature as input. In other words, the relevance value indicates how useful the feature is to a model attempting to perform a given task. In some instances, operation 608 may include providing an initial overall expected accuracy of a model. The initial expected accuracy may be based upon relevance values of feature clusters expected to be included in a pruned data space. In some instances, the expected pruned data space may be a data space including all features relevant to a goal task except those which are also relevant to sensitive data. For example, referring again to the three feature clusters discussed above with reference to operation 604, the expected pruned data space may only the include the first feature cluster (as the second and third feature clusters are relevant to sensitive information, even though the third feature cluster is also relevant to the goal task), so operation 608 may include an overall accuracy value based upon the relevance value of the first feature cluster. In some instances, the expected pruned data space may be a data space including all features relevant to a goal task regardless of relevance to sensitive information. For example, referring again to the same three feature clusters, the expected pruned data space may only include the first feature cluster and the third feature cluster (as the second feature cluster is not relevant to the goal task). Operation 608 may further include presenting labels of the feature clusters (e.g., "hair density," "eye shape," etc.) and/or sensitive data type(s) at risk (e.g., "age,"), as well as the goal task (e.g., "expression classification"). In some instances, operation 608 may include presenting information describing all features of an input data space (e.g., including "leftover" feature clusters, such as feature cluster 510 of FIG. 5).

In some instances, the accuracy impact may be weighted depending upon an importance of a given type of sensitive data. For example, the second and third clusters may be particularly relevant to age (having example sensitive information relevance values of 75% and 81%, respectively), while a fourth cluster may be moderately relevant to gender (with an example sensitive information relevance value of 67%). However, gender may be considered a more sensitive type of data than age (relative sensitivities of various types of sensitive data may be based on user input). Thus, the sensitive information relevance value of the fourth cluster may be multiplied by a weight (e.g., 1.5) associated with more sensitive data types, resulting in a weighted sensitive information relevance value of 67%*1.5~100%, while the second and third clusters may be multiplied be a second weight (e.g., 1.0) associated with less sensitive data types resulting in second and third weighted sensitive information relevance values of 75% and 81%, respectively. These weights and the sensitive data types they are applied to may be configured based on user input or default values.

Operation 608 may further include prompting the user to select and/or approve feature clusters for pruning. For example, a feature cluster that may be particularly relevant to a goal task as well as sensitive information (such as the third feature cluster) may be highlighted, prompting a user to decide whether to remove or retain the feature cluster in the data space. Operation 608 may further include listing the accuracy penalty (determined at operation 604) associated with removing the highlighted feature cluster.

Method 600 further comprises receiving a user input at operation 610. Operation 610 may include, for example, detecting a button press, spoken approval, etc. The user input may indicate a feature cluster to be pruned (or retained). In response to receiving the user input, operation 610 may modify the information being presented to the user (such as to update an expected accuracy of a model assuming a given feature cluster has been removed or re-added), indicated in FIG. 6 by a dashed line returning to operation 608. Operation 610 may further include waiting for a user input associated with a final confirmation or approval to proceed. In some instances, operation 610 may include a timeout wherein, without receiving user input for a period of time (e.g., 1 hour), a default setting may be implemented. The default setting may vary depending upon implementation. For example, in a financial use case, the default setting may be to maximize security of sensitive information, resulting in a default setting of pruning all feature clusters having a sensitive relevance value above a given threshold, regardless of their goal relevance. In a different use case, the default setting may be to evenly balance goal performance with security of sensitive information, resulting in a default setting of pruning all feature clusters whose sensitive relevance value is greater than their goal relevance.

Method 600 further comprises pruning, at operation 612, the data space based upon the user input received at operation 610. Operation 612 may include, for example, deleting one or more clusters of features from a file. Method 600 further comprises transmitting the pruned data space at operation 614. Operation 614 may include, for example, compiling the remaining features of the pruned subspace into one or more data packets for transmission. The pruned subspace may be transmitted to, for example, a Machine Learning as a Service (MLaaS) provider to be utilized as training data toward the goal task.

The data space received at operation 602 may be unencoded data (such as an image file) or encoded features. Operations 602-612 may be performed similarly regardless of whether the data space is encoded or unencoded. However, if the data space is unencoded, operation 614 may include encoding the pruned subspace prior to transmission.

Figure 7:
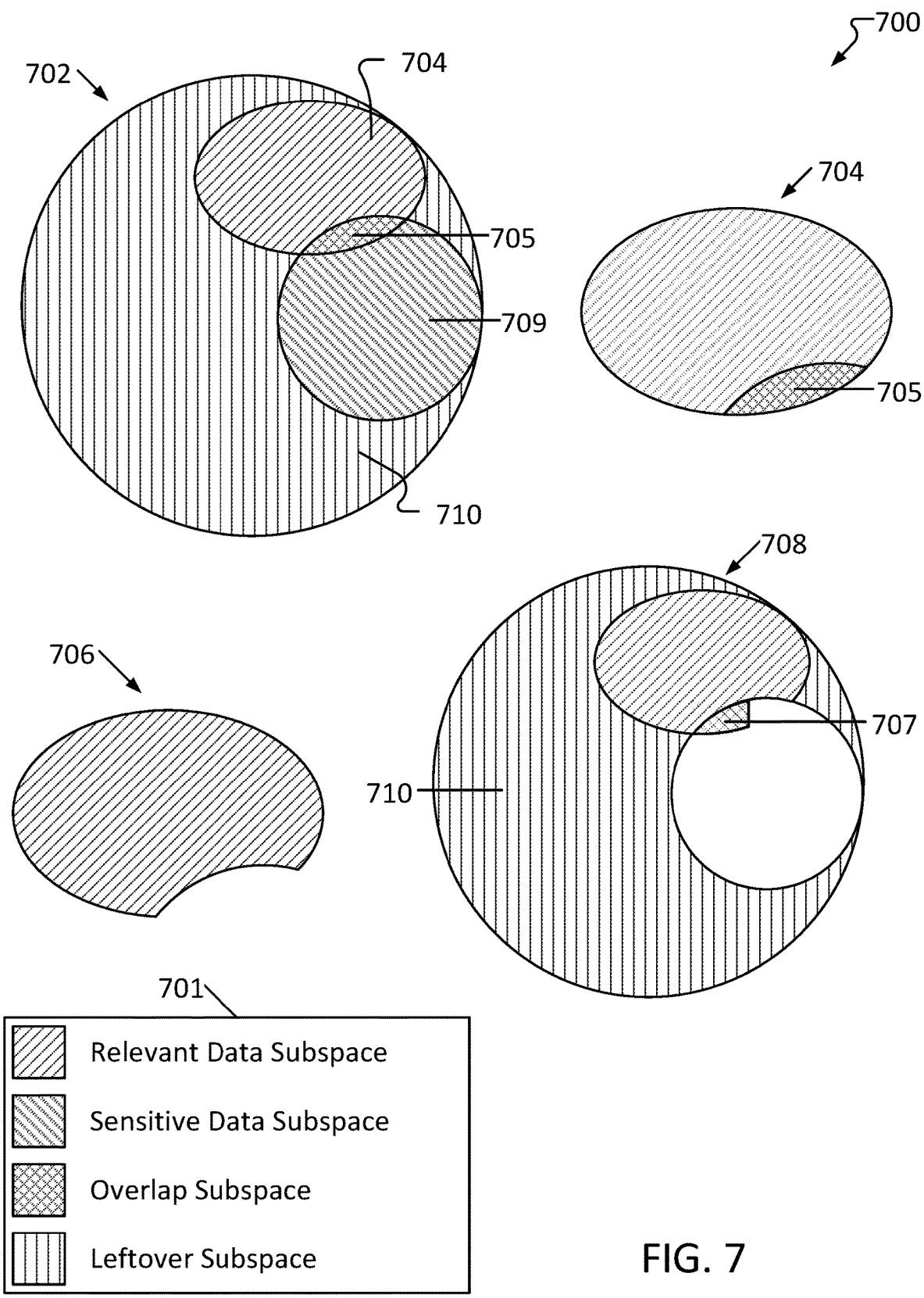
FIG. 7 is a schematic diagram depicting several examples of possible pruned subspaces to be encoded, consistent with several embodiments of the present disclosure.

FIG. 7 depicts several examples of possible pruned subspaces to be encoded, consistent with several embodiments of the present disclosure. The subspaces depicted in FIG. 7 may be generated from pruning an input data space such as, for example, input data space 702, which may be substantially similar to input data space 502 depicted in FIG. 5. The subspaces depicted in FIG. 7 each have their own benefits and tradeoffs such that any may be useful depending upon setting, implementation, etc. For example, a first subspace 704 includes an entirety of a goal-relevant data subspace, even though the goal-relevant data subspace overlaps with a sensitive data subspace. Thus, subspace 704 includes overlap subspace 705. Overlap subspace 705 may provide improved performance of a model performing a goal task, but may also improve performance of an adversarial model attempting to determine sensitive information. Subspace 704 may be useful in settings where a sensitive data type is put at risk by overlap subspace 705 is not of significant concern, or where a goal task is particularly important.

A second subspace 706 includes a remainder of subspace 704 after overlap subspace 705 has been removed. In essence, subspace 706 may result in a slightly reduced performance of a goal task, but increased security of sensitive information. Notably, both subspace 704 and subspace 706 provide improved security of sensitive information due to pruning features that are not relevant to the goal task but are relevant to the sensitive information (i.e., sensitive data subspace 709). Additionally, subspace 706 is the smallest, most condensed subspace, meaning a transmission may require fewer computing resources.

A third subspace 708 includes most of subspace 704, but only a portion 707 of overlap subspace 705. This may be beneficial if subspace 706 does not provide sufficient accuracy, but the entirety of overlap subspace 705 results in too much risk to sensitive information. Subspace 708 also includes a leftover subspace 710. Subspace 708 may include leftover subspace 710 as it may provide a minor boost to accuracy without a significant risk of exposing sensitive data, and may be desirable if a developer wishes to train a model based on as diverse a data space as possible while still pruning out data that exposes sensitive data. In some instances, leftover subspace 710 may be omitted. For example, a subspace (not shown) might include subspace 706 with the addition of portion 707.

Figure 8:
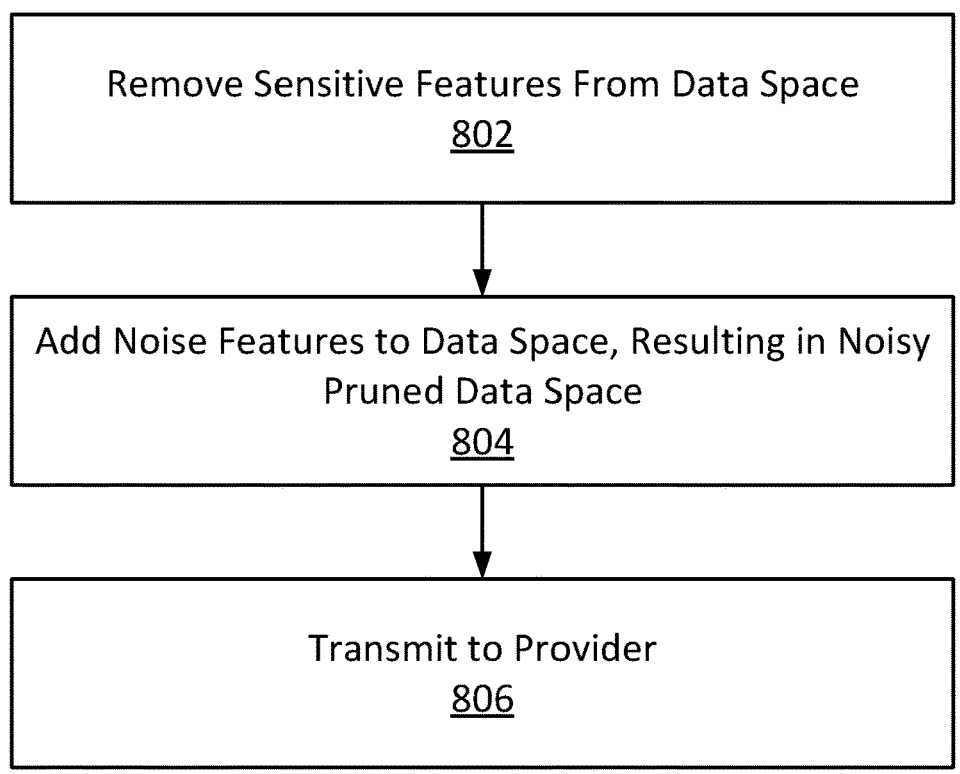
FIG. 8 is an example method for pruning an information space and including noise, consistent with several embodiments of the present disclosure.

FIG. 8 is an example method 800 for pruning an information space and including noise, consistent with several embodiments of the present disclosure. Noise may be added to a subspace in an attempt to confuse or mislead potential malicious actors, obscuring sensitive information. Method 800 comprises removing sensitive features from a data space at operation 802. Operation 802 may be performed in accordance with, for example, operations 102-108 of method 100, operations 602-612 of method 600, etc.

Method 800 further comprises adding one or more noise features to a pruned data space, resulting in a noisy pruned data space at operation 804. Operation 804 may include, for example, replacing sensitive features removed at operation 802 with randomized data. In some instances, operation 804 may further include testing added noise to determine whether sensitive data is still vulnerable, and adjusting the added noise responsive to a determination that it is. Method 800 further comprises transmitting the resulting pruned data space (such as to a Machine Learning as a Service (MLaaS) provider) at operation 806. Due to the added noise, even if the transmission at operation 806 is intercepted by a malicious actor, the malicious actor may be unable to extract accurate sensitive information from the data space.

As an explanatory example, an image of a young person's face may be deemed to render age data vulnerable. In particular, a pretrained age model can utilize a region of the image including the young person's hairline (the "hairline region") in combination with a region of the image including the young person's face (the "face region") to reliably identify that the person is young. A goal task may be to identify whether the person is smiling in the image. Various parts of the face region may be particularly useful in performance of the goal task. However, the hairline region may not be relevant to the goal task. Further, other regions of the image (such as a car parked on a street in the background of the image, a collar of the young person's shirt, etc.) are not relevant to either the age data or the goal task (the "leftover regions"). Systems and methods consistent with the present disclosure may omit the hairline region entirely, such as by cropping the image and removing all pixels above the brow of the young person's face. However, as the young person's face is still relevant to age data (and removing the young person's face from the image may hinder performance of the goal task to an unacceptable degree), the age data may still be vulnerable; a model may still be able to determine that the person is young. An adversarial model receiving input of both the hairline region and the face region may be able to identify that the person is young with 98% accuracy, but the adversarial model receiving input of just the face region (i.e., with no hairline region) may still be able to determine that the person is young with 87% accuracy. Thus, in some instances, noise may be added to replace or modify the hairline region.

As a simple example of adding noise, the young person's hairline region may be outright replaced with a hairline region from an image of an older person, possibly along with some blending at a border between the regions to blend them together. The goal is essentially to trick an adversarial model to base its evaluation on the "wrong" hairline region, hindering its performance; the adversarial model receiving input of the young person's face region and the older person's hairline region may only be able to determine that the person is young with 63% accuracy.

Notably, replacing the hairline region with completely unrelated image data such as an image of a cat (or completely random pixels, a black bar, etc.) may not be particularly useful, as an adversarial model may not even recognize the image of the cat as a hairline (and thus may dismiss it similar to how it may dismiss a car in the background, resulting in performance similar to the "cropped" example). Thus, added noise may take the form of replacing the sensitive data subspace with a similar (but distinct) subspace.

Care must also be taken to not inadvertently reveal the sensitive data by attempts to obscure it. For example, consistently replacing hairline regions of images of young faces with hairline regions from images of older faces may be detected by a sophisticated adversarial model; the model may be able to identify that the image has been modified with an older person's hairline, and leverage that information to infer that the person in the image is young. Thus, it may be beneficial to ensure noise has some degree of randomness; in the simple example, the replacement hairline region may be selected from a random pool of images. For instance, the hairline regions of a set of input images may simply be shuffled at random amongst the images.

In some instances, added noise may hinder performance of a goal task as well as an adversary's attempt to extract sensitive information. However, the added noise may affect goal task performance and sensitive information vulnerability to different degrees; for example, a subspace with no added noise may be 90% relevant to a goal task and 35% relevant to sensitive information. Adding noise to the subspace may result in a "noisy" subspace that is 88% relevant to the goal task and 10% relevant to the sensitive information. The different impacts on goal task and sensitive information relevance may vary based upon the nature of the noise added. For example, blurring a region of an input image may result in a 50% reduction in goal task relevance and a 55% reduction in sensitive information relevance, while removing the region may result in a 10% reduction in goal task relevance and a 25% reduction in sensitive information relevance. Thus, noise added at operation 804 may be checked to determine whether it negatively impacts a goal task, and if so, to what extent. In some instances, models can be trained based on different types of added noise to determine an "impact ratio" (describing a ratio of impact on goal task relevance to impact on sensitive information relevance) of each type of added noise.

Figure 9:
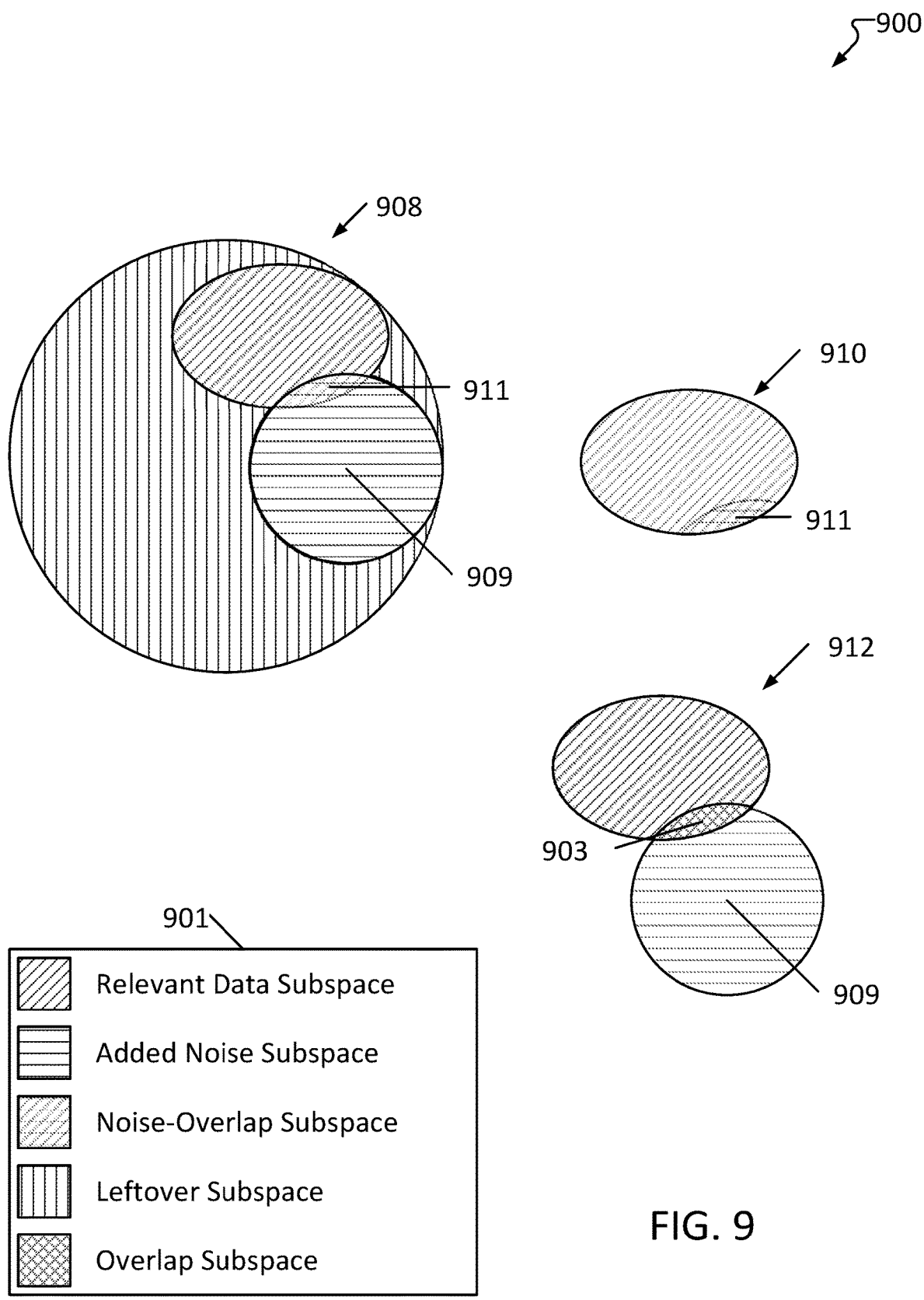
FIG. 9 is a schematic diagram depicting additional example pruned subspaces including added noise, consistent with several embodiments of the present disclosure.

FIG. 9 is a schematic diagram 900 depicting additional example pruned subspaces including added noise, consistent with several embodiments of the present disclosure. The various subspaces depicted in FIG. 9 are hashed according to labels in legend 901.

For example, pruned subspace 908 may be generated by removing a sensitive data subspace (including an overlap subspace) from an input subspace, and replacing the sensitive subspace with added noise 909. In some instances, the sensitive data subspace may only be modified with added noise. Noise 909 may include a "noise-overlap" 911. In particular, noise 909 may simulate or resemble the sensitive data subspace. For example, if the sensitive data subspace included curves in a given region of an input image, the curves may be removed and replaced with different curves in the same region of the image. This may hinder performance of an adversarial model even when compared to simply omitting the sensitive data subspace, as the adversarial model may erroneously incorporate noise 909 into its determination. Thus, subspace 908 may result in similar goal task performance when compared to subspace 706 of FIG. 7 (or even subspace 200 of FIG. 2), but may advantageously result in further security of sensitive information.

The overlap subspace may be replaced or modified with noise as well, although this may be unlikely to have a substantial impact on performance of an adversarial model. As an example, replacing an irrelevant background of an image of a person's face with a different irrelevant background may not hinder performance of a model trained to detect an age of the person.

In some instances, in addition to noise, one or more adversarial patches may be added to an input image. Adversarial patches are an emerging technology designed to deceive given object recognition models. A visual adversarial patch may appear to a user as meaningless noise, similar to corrupted image data, but when included in an image, a machine learning model's analysis of the image may be significantly skewed. This could be leveraged to further protect sensitive information; for example, a patch designed to fool a certain age model could be included in a background of an image of a person's face, resulting in the age model erroneously determining, with near-100% confidence, that the person's age is some nonsensical value (e.g., massive values such as 33,402 years, negative values such as −3 years, etc.). However, these patches may result in such exaggeratedly hindered performance that they may be detected by other systems or users reviewing results of the age model. For example, a malicious actor may notice that the age model's prediction is nonsensical, which may prompt the malicious actor to investigate, discover the patch, and manually remove the patch from the image before re-running the model. Further, adversarial patches frequently must be tailored to specific models to be effective; a first age model may predict that a depicted person is −8,302,541 years of age, while a different age model may correctly predict that the same person (in the same image, including the same adversarial patch) is 35 years of age. Thus, simple noise resulting in incorrect (but still plausible) values may be preferable.

A second pruned subspace 910 may be similar to subspace 908, but without a leftover subspace. Subspace 910 may be preferable to reduce transmission bandwidth, or to further improve security of sensitive information (as the omitted leftover subspace might have a minor impact on sensitive information exposure). The added noise subspace may include a noise-overlap subspace 911, included in both subspace 908 and subspace 910.

A third pruned subspace 912 may include the noise subspace 909, but also retain an "original" overlap subspace 903 (i.e., an overlap of a relevant data subspace and a sensitive data subspace). Subspace 912 may enable a system to leverage the goal task relevance of overlap subspace 903 while attenuating the sensitive information risks of including overlap subspace 903 by misleading potential adversaries via noise 909.

Figure 10:
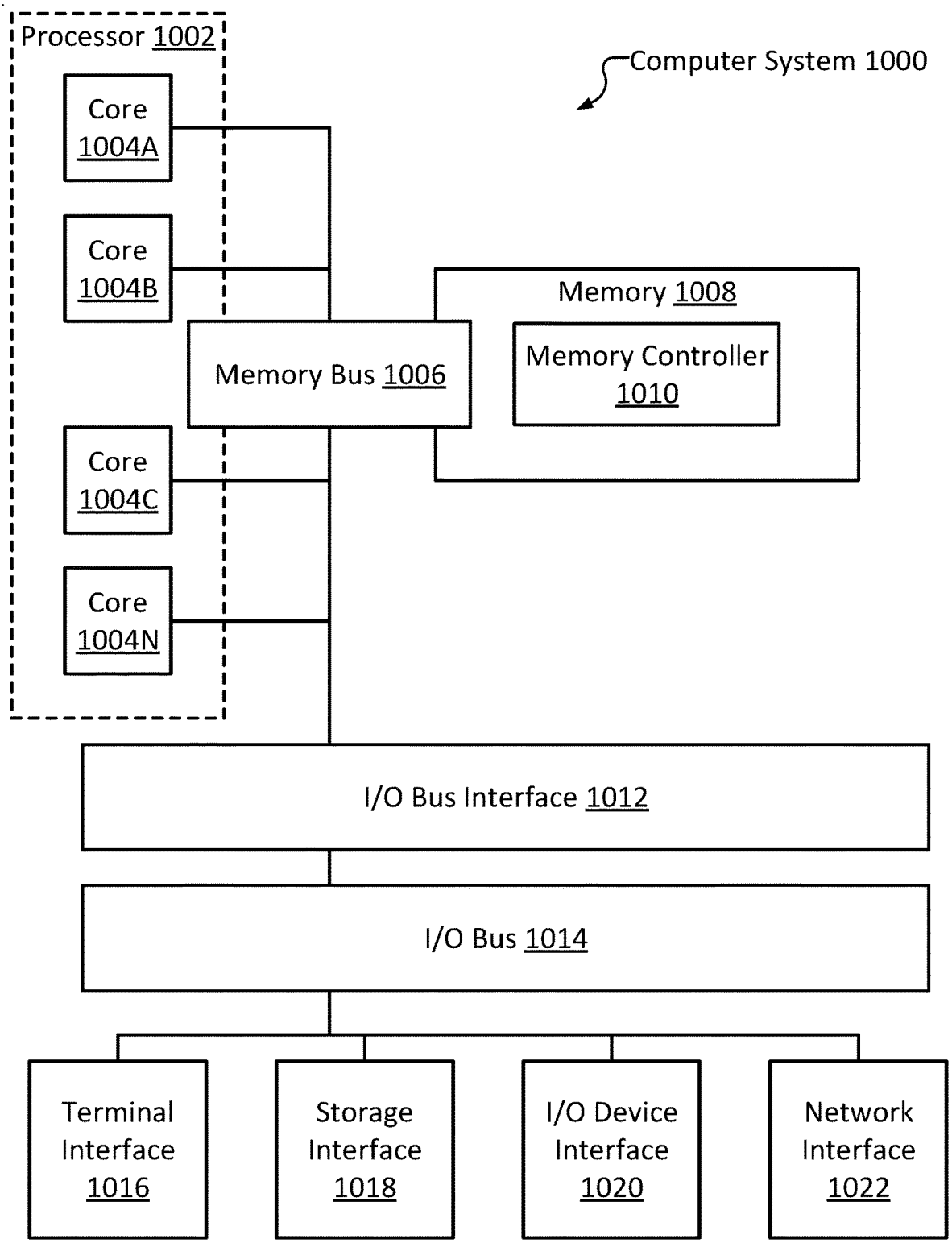
FIG. 10 illustrates a high-level block diagram of an example computer system that may be used in implementing embodiments of the present disclosure.

FIG. 10 illustrates a high-level block diagram of an example computer system that may be used in implementing embodiments of the present disclosure. Referring now to FIG. 10, shown is a high-level block diagram of an example computer system 1000 that may be configured to perform various aspects of the present disclosure, including, for example, methods 100, 300, 600, and 800. The example computer system 1000 may be used in implementing one or more of the methods or modules, and any related functions or operations, described herein (e.g., using one or more processor circuits or computer processors of the computer), in accordance with embodiments of the present disclosure. In some embodiments, the major components of the computer system 1000 may comprise one or more CPUs 1002, a memory subsystem 1008, a terminal interface 1016, a storage interface 1018, an I/O (Input/Output) device interface 1020, and a network interface 1022, all of which may be communicatively coupled, directly or indirectly, for inter-component communication via a memory bus 1006, an I/O bus 1014, and an I/O bus interface unit 1012.

The computer system 1000 may contain one or more general-purpose programmable processors 1002 (such as central processing units (CPUs)), some or all of which may include one or more cores 1004A, 1004B, 1004C, and 1004N, herein generically referred to as the CPU 1002. In some embodiments, the computer system 1000 may contain multiple processors typical of a relatively large system; however, in other embodiments the computer system 1000 may alternatively be a single CPU system. Each CPU 1002 may execute instructions stored in the memory subsystem 1008 on a CPU core 1004 and may comprise one or more levels of on-board cache.

In some embodiments, the memory subsystem 1008 may comprise a random-access semiconductor memory, storage device, or storage medium (either volatile or non-volatile) for storing data and programs. In some embodiments, the memory subsystem 1008 may represent the entire virtual memory of the computer system 1000 and may also include the virtual memory of other computer systems coupled to the computer system 1000 or connected via a network. The memory subsystem 1008 may be conceptually a single monolithic entity, but, in some embodiments, the memory subsystem 1008 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 1008 may contain elements for control and flow of memory used by the CPU 1002. This may include a memory controller 1010.

Although the memory bus 1006 is shown in FIG. 10 as a single bus structure providing a direct communication path among the CPU 1002, the memory subsystem 1008, and the I/O bus interface 1012, the memory bus 1006 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1012 and the I/O bus 1014 are shown as single respective units, the computer system 1000 may, in some embodiments, contain multiple I/O bus interface units 1012, multiple I/O buses 1014, or both. Further, while multiple I/O interface units are shown, which separate the I/O bus 1014 from various communications paths running to the various I/O devices, in other embodiments some or all of the I/O devices may be connected directly to one or more system I/O buses.

In some embodiments, the computer system 1000 may be a multi-user mainframe computer system, a single-user system, or a server computer or similar device that has little or no direct user interface but receives requests from other computer systems (clients). Further, in some embodiments, the computer system 1000 may be implemented as a desktop computer, portable computer, laptop or notebook computer, tablet computer, pocket computer, telephone, smart phone, mobile device, or any other appropriate type of electronic device.

It is noted that FIG. 10 is intended to depict the representative major components of an exemplary computer system 1000. In some embodiments, however, individual components may have greater or lesser complexity than as represented in FIG. 10, components other than or in addition to those shown in FIG. 10 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a computing device a data space;
   identifying, by one or more learning models and based on the data space, a first set of features that are relevant to sensitive information;
   defining a sensitive subspace within the data space, the sensitive subspace including the first set of features;
   calculating a confidence score for the first set of features, wherein the confidence score represents a likelihood a sensitive data can be discerned from the first set of features;
   determining the first set of features is vulnerable based on the confidence score being above a vulnerability threshold;
   identifying, by the one or more learning models and based on the data space, a second set of features that are relevant to a goal task, wherein the goal task is related to an output of a learning model of the one or more learning models of a provider;
   defining a goal subspace within the data space, the goal subspace including the second set of features, wherein the goal task is a task completed by a learning model using the goal subspace;
   identifying a first subset of features, wherein the first subset of features comprises data included within the sensitive subspace but not included within the goal subspace;
   pruning, by the computing device and in response to the identifying the first subset of features, the data space, the pruning including removing the first subset of features from the data space, resulting in a pruned data space, wherein the pruning includes encoding the pruned data space; and
   transmitting, by the computing device, the pruned data space to the provider.

2. The method of claim 1, further comprising identifying a second subset of features included within the sensitive subspace and included within the goal subspace, wherein the pruning further includes removing the second subset of features from the data space.

3. The method of claim 1, wherein the calculating the confidence score further comprises:
   submitting the data space to a machine learning model trained to extract sensitive information;
   receiving the confidence score from the machine learning model describing a confidence that the machine learning model can extract the sensitive information; and
   comparing the confidence score to the vulnerability threshold.

4. The method of claim 1, further comprising:
   receiving annotations describing sensitive information;
   training, based on the data space and the annotations, a machine learning model to determine the sensitive information, resulting in a trained machine learning model;
   determining a third accuracy of the trained machine learning model;
   comparing the third accuracy to an accuracy threshold; and
   determining, based on the comparing, that the sensitive information is vulnerable.

5. The method of claim 1, wherein the identifying the second set of features includes:
   organizing the data space into a set of feature clusters;
   training, via a first feature cluster of the set of feature clusters, a first machine learning model to perform the goal task, resulting in a first trained machine learning model;
   determining a first accuracy of the first trained machine learning model;
   training, via a second cluster of the set of clusters, a second machine learning model to perform the goal task, resulting in a second trained machine learning model;
   determining a second accuracy of the second trained machine learning model;
   comparing the first accuracy to the second accuracy; and determining, based on the comparing, that the second feature cluster is relevant to the goal task.

6. The method of claim 1, further comprising:
receiving a user input, wherein the pruning is based on the user input.

7. The method of claim 1, further comprising adding, based on the sensitive subspace, noise to the data space, wherein the pruned data space includes the added noise.

8. A system, comprising:
a memory; and
a processor coupled to the memory, the processor configured to:
receive a data space;
identify, based on the data space, a first set of features that are relevant to sensitive information;
define a sensitive subspace within the data space, the sensitive subspace including the first set of features;
calculate a confidence score for the first set of features, wherein the confidence score represents a likelihood a sensitive data can be discerned from the first set of features;
determine the first set of features is vulnerable based on the confidence score being above a vulnerability threshold;
identify, based on the data space, a second set of features that are relevant to a goal task;
define a goal subspace within the data space, the goal subspace including the second set of features, wherein the goal task is a task completed by a learning model using the goal subspace;
identify a first subset of features included within the sensitive subspace but not included within the goal subspace, wherein the goal task is related to an output of a learning model of a provider;
prune, in response to the identification of the first subset of features, the data space, the pruning including removing the first subset of features from the data space, resulting in a pruned data space, wherein the pruning includes encoding the pruned data space; and
transmit the pruned data space to the provider.

9. The system of claim 8, wherein the processor is further configured to identify a second subset of features included within the sensitive subspace and included within the goal subspace, wherein the pruning further includes removing the second subset of features from the data space.

10. The system of claim 8, wherein the processor is further configured to:
submit the data space to a machine learning model trained to extract sensitive information;
receive the confidence score from the machine learning model describing a confidence that the machine learning model can extract the sensitive information; and
compare the confidence score to the vulnerability threshold.

11. The system of claim 8, wherein the processor is further configured to:
receive annotations describing sensitive information;
train, based on the data space and the annotations, a machine learning model to determine the sensitive information, resulting in a trained machine learning model;
determine a third accuracy of the trained machine learning model;
compare the third accuracy to an accuracy threshold; and
determine, based on the comparing, that the sensitive information is vulnerable.

12. The system of claim 8, wherein the identifying the second set of features includes:
organizing the data space into a set of feature clusters;
training, via a first feature cluster of the set of feature clusters, a first machine learning model to perform the goal task, resulting in a first trained machine learning model;
determining a first accuracy of the first trained machine learning model;
training, via a second cluster of the set of clusters, a second machine learning model to perform the goal task, resulting in a second trained machine learning model;
determining a second accuracy of the second trained machine learning model;
comparing the first accuracy to the second accuracy; and
determining, based on the comparing, that the second feature cluster is relevant to the goal task.

13. The system of claim 8, wherein the processor is further configured to:
determine an accuracy impact of pruning;
present the accuracy impact to a user; and
receive a user input, wherein the pruning is based on the user input.

14. The system of claim 8, wherein the processor is further configured to add, based on the sensitive subspace, added noise to the data space, wherein the pruned data space includes the added noise.

15. A computer program product, the computer program product comprising a computer readable storage medium having program instructions embodied therewith, the program instructions executable by a computer to cause the computer to:
receive a data space;
identify, based on the data space, a first set of features that are relevant to sensitive information;
define a sensitive subspace within the data space, the sensitive subspace including the first set of features;
calculate a confidence score for the first set of features, wherein the confidence score represents a likelihood a sensitive data can be discerned from the first set of features;
determine the first set of features is vulnerable based on the confidence score being above a vulnerability threshold;
identify, based on the data space, a second set of features that are relevant to a goal task, wherein the goal task is related to an output of a learning model of a provider;
define a goal subspace within the data space, the goal subspace including the second set of features, wherein the goal task is a task completed by a learning model using the goal subspace;
identify a first subset of features, wherein the first subset of features comprises data included within the sensitive subspace but not included within the goal subspace;
prune the data space, the pruning including removing the first subset of features from the data space, resulting in a pruned data space, wherein the pruning includes encoding the pruned data space; and
transmit the pruned data space to the provider.

16. The computer program product of claim 15, wherein the instructions further cause the computer to identify a second subset of features included within the sensitive subspace and included within the goal subspace, wherein the pruning further includes removing the second subset of features from the data space.

17. The computer program product of claim 15, wherein the instructions further cause the computer to:
submit the data space to a machine learning model trained to extract sensitive information;
receive the confidence score from the machine learning model describing a confidence that the machine learning model can extract the sensitive information; and
compare the confidence score to the vulnerability threshold.

18. The computer program product of claim 15, wherein the instructions further cause the computer to:
receive annotations describing sensitive information;
train, based on the data space and the annotations, a machine learning model to determine the sensitive information, resulting in a trained machine learning model;
determine a third accuracy of the trained machine learning model;
compare the third accuracy to an accuracy threshold; and
determine, based on the comparing, that the sensitive information is vulnerable.

19. The computer program product of claim 15, wherein the identifying the second set
of features includes:
organizing the data space into a set of feature clusters;
training, via a first feature cluster of the set of feature clusters, a first machine learning model to perform the goal task, resulting in a first trained machine learning model;
determining a first accuracy of the first trained machine learning model;
training, via a second cluster of the set of clusters, a second machine learning model to perform the goal task, resulting in a second trained machine learning model;
determining a second accuracy of the second trained machine learning model;
comparing the first accuracy to the second accuracy; and
determining, based on the comparing, that the second feature cluster is relevant to the goal task.

20. The method of claim 1, further comprising:
determining a first impact on an accuracy of the goal for pruning the first subset of features from the data space; and
determining a second impact on the confidence score for pruning the first subset of features from the data space.

* * * * *